United States Patent [19]
Jones et al.

[11] Patent Number: 5,249,161
[45] Date of Patent: Sep. 28, 1993

[54] METHODS AND APPARATUS FOR PREVENTING JAMMING OF ENCODER OF LOGGING WHILE DRILLING TOOL

[75] Inventors: Phillip K. Jones, Houston; David Malone, Sugar Land, both of Tex.

[73] Assignee: Schlumberger Technology Corporation, Houston, Tex.

[21] Appl. No.: 934,082

[22] Filed: Aug. 21, 1992

[51] Int. Cl.$^5$ .............................. H04H 9/00
[52] U.S. Cl. ...................... 367/83; 367/84; 175/40
[58] Field of Search ............ 367/81, 83, 84, 85; 175/40, 45; 340/853.3, 854.3, 856.4

[56] References Cited

U.S. PATENT DOCUMENTS

| | | | |
|---|---|---|---|
| Re. 29,734 | 8/1978 | Manning | 367/81 |
| 3,764,968 | 10/1973 | Anderson | 367/81 |
| 4,103,281 | 7/1978 | Strom et al. | 367/84 |
| 4,167,000 | 9/1979 | Bernard et al. | 367/84 |

*Primary Examiner*—J. Woodrow Eldred
*Attorney, Agent, or Firm*—David P. Gordon; Wayne I. Kanak; John J. Ryberg

[57] ABSTRACT

Methods and apparatus for determining whether an encoder of a borehole tool is jammed are disclosed. The borehole tool has a motor with a drive shaft which is coupled to and drives an encoder, a position sensor coupled to the motor for sensing the position of the motor, and a microprocessor coupled to the position sensor and to the motor in a feedback loop, with the microprocessor controlling the movement of the motor based on the sensed position of the motor and the desired position of the motor. The method for determining jamming includes: determining, at a first plurality of times, positions of the motor from the position sensor; determining position errors of the motor from the positions of the motor and desired positions of the motor as determined by the microprocessor; and determining whether the encoder is jammed based on whether the position error exceeds a threshold value. In determining jamming, the microprocessor can also determine the rotational velocity of the motor, and account is taken of whether the motor velocity exceeds a threshold velocity at a time when the position error exceeds its threshold value.

19 Claims, 16 Drawing Sheets

| FIG. 2a | FIG. 2b | BULKHEAD | SENSORS | ELECTRONICS MICROPROCESSOR MEMORY | COMPENSATOR | FIG. 2c | FIG. 2d |
|---|---|---|---|---|---|---|---|
| | | 84 | 19 | 90  91 | 92 | | |

METHODS AND APPARATUS FOR PREVENTING JAMMING OF ENCODER OF LOGGING WHILE DRILLING TOOL

BACKGROUND OF THE INVENTION

1. Field of the Invention

This invention relates to communication systems, and more particularly, to systems and methods for generating and transmitting data signals to the surface of the earth in a logging-while-drilling system.

2. Prior Art

Logging-while-drilling or measurement-while-drilling (both hereinafter referred to as LWD) involves the transmission to the earth's surface of downhole measurements taken during drilling. The measurements are generally taken by instruments mounted within drill collars above the drill bit. Indications of the measurements must then be transmitted uphole to the earth's surface. Various schemes have been proposed for achieving transmission of measurement information to the earth's surface. For example, one proposed technique transmits logging measurements by means of insulated electrical conductors extending through the drill string. This scheme, however, requires adaptation of drill string pipes including expensive provision for electrical connections at the drill pipe couplings. Another proposed scheme employs an acoustic wave that is generated downhole and travels upward through the metal drill string; but the high levels of interfering noise in a drill string are a problem in this technique.

The most common scheme for transmitting measurement information utilizes the drilling fluid within the borehole as a transmission medium for acoustic waves modulated to represent the measurement information. Typically, drilling fluid or "mud" is circulated downward through the drill string and drill bit and upward through the annulus defined by the portion of the borehole surrounding the drill string. The drilling fluid not only removes drill cuttings and maintains a desired hydrostatic pressure in the borehole, but cools the drill bit. In a species of the technique referred to above, a downhole acoustic transmitter known as a rotary valve or "mud siren", repeatedly interrupts the flow of the drilling fluid, and this causes a varying pressure wave to be generated in the drilling fluid at a frequency that is proportional to the rate of interruption. Logging data is transmitted by modulating the acoustic carrier as a function of the downhole measured data.

One difficulty in transmitting measurement information via the drilling mud is that the signal received is typically of low amplitude relative to the noise generated by the mud pumps which circulate the mud, as the downhole signal is generated remote from the uphole sensors while the mud pumps are close to the uphole sensors. In particular, where the downhole tool generates a pressure wave that is phase modulated to encode binary data, such as is disclosed in U.S. Pat. No. 4,847,815 and assigned to the assignee hereof, and where the periodic noise sources are at frequencies which are at or near the frequency of the carrier wave (e.g. 12 Hz), difficulties arise.

Mud pumps are large positive displacement pumps which generate flow by moving a piston back and forth within a cylinder while simultaneously opening and closing intake and exhaust valves. A mud pump typically has three pistons attached to a common drive shaft. These pistons are one hundred and twenty degrees out of phase with one another to minimize pressure variations. Mud pump noise is caused primarily by pressure variations while forcing mud through the exhaust valve.

The fundamental frequency in Hertz of the noise generated by the mud pumps is equal to the strokes per minute of the mud pump divided by sixty. Due to the physical nature and operation of mud pumps, harmonics are also generated, leading to noise peaks of varying amplitude at all integer values of the fundamental frequency. The highest amplitudes generally occur at integer multiples of the number of pistons per pump times the fundamental frequency, e.g., 3F, 6F, 9F, etc. for a pump with three pistons.

Mud pumps are capable of generating very large noise peaks if pump pressure variations are not dampened. Thus, drilling rigs are typically provided with pulsation dampeners at the output of each pump. Despite the pulsation dampeners, however, the mud pump noise amplitude is typically much greater than the amplitude of the signal being received from the downhole acoustic transmitter.

SUMMARY OF THE INVENTION

It is therefore an object of the invention to provide a LWD system and method where the carrying frequency of the generated signal is chosen to avoid noisy areas of the frequency spectrum.

It is another object of the invention to provide a tool which can generate a signal at different frequencies up to at least 24 Hz.

It is a further object of the invention to provide a LWD tool which utilizes a brushless DC motor for turning a rotor and generating a sinusoidal signal of desired frequency.

Another object of the invention is to provide a LWD tool capable of using different data transmission techniques such as phase shift keying (PSK) and frequency shift keying (FSK) to provide an LWD signal.

A further object of the invention is to provide a LWD tool having a permanent magnet, brushless DC motor with a position sensor and a microprocessor for relatively high frequency data transmission and for jamming avoidance.

An additional object of the invention is to provide a LWD tool utilizing a brushless DC motor for providing a PSK signal in conjunction with a magnetic positioner on a drive shaft of the motor, where the phase shifting is coordinated with the magnetic positioner at desired times in the cycle of the motor.

Yet another object of the invention is to provide a jamming avoidance algorithm for a LWD tool utilizing a brushless DC motor with a position sensor and a microprocessor.

In accord with the objects of the invention, a LWD tool is provided and generally comprises, a stator, a rotor which rotates relative to the stator thereby effecting a signal in the borehole fluid flowing therethrough, a brushless DC motor coupled to the rotor for driving the rotor, a position sensor coupled to the motor for sensing the rotational position of the motor, motor drive electronics coupled to motor for driving the motor, and a microprocessor coupled to the position sensor and to the drive electronics for controlling the drive signals to the motor based on the actual and desired positions of the motor. By controlling the drive signal to the motor, the speed of the motor is controlled, thus effecting changes in frequency and/or phase of the signal in the borehole fluid or mud. With the ability to change the frequency and/or phase, different encoding techniques such as phase shift keying (PSK) and variants thereon (hereinafter referred to as "PSK-type") and frequency shift keying (FSK) and variants thereon (hereinafter referred to as "FSK-type") can be used.

One preferred embodiment of the LWD tool uses PSK-type encoding. Because the LWD tool has the ability to provide signals of different frequencies, a method which utilizes that ability in a PSK-type coding scheme is provided. The method comprises obtaining a sample of the noise in the system, analyzing the system noise with a spectrum analyzer (i.e., taking a Fourier transform of the noise), and choosing an operating carrier frequency for the LWD tool which generates the PSK-type encoded signal at a frequency with relatively little noise. In this manner the signal/noise ratio of the tool is effectively increased.

Another preferred embodiment of the LWD tool uses FSK-type encoding. The previously summarized noise analysis of the system is also advantageously utilized in the FSK-type system, as the frequencies used for conveying information are chosen to avoid high system noise frequencies. With FSK-type encoding, if, for example, eight different transmission frequencies are utilized, three bits of information can be sent at a time during each signal period.

Another preferred aspect of the tool is the provision of a magnetic positioner on a rotating component of the drive shaft system (e.g., on the drive shaft of the motor). The magnetic positioner guarantees that upon shutdown of the system, the rotor is rotated to a fully open position. In the fully open position, mud flows through relatively unimpeded, and jamming and/or loss of power is avoided.

Other aspects of the invention include the timing of the phase shifting of the PSK-type signal, and an anti-jamming algorithm. The timing of the phase shifting of the PSK-type signal is arranged to coordinate with the magnetic positioner so that the drive shaft is in position for the magnetic positioner to provide resistance during the period of time the rotor is slowing down, while the drive shaft is in position for the magnetic positioner to provide impetus during the period of time the rotor is speeding up. This timing of the phase shifting is accomplishable due to the fact that the motor has a position sensor. The anti-jamming algorithm is also accomplishable due to the position sensor. The anti-jamming algorithm utilizes the position error of the motor in conjunction with the motor velocity in order to determine whether or not there is a jam. If the rotor velocity is below a predetermined velocity threshold, and the position error has reached a predetermined maximum value, a jam is detected. However, where the position error has reached the predetermined maximum value, but the velocity threshold has not been met, rather than a jam, a low power state is declared, where not enough power is available to turn the motor at the commanded speed. In this state, the carrier frequency of the system is preferably reduced.

Additional objects and advantages of the invention will become apparent to those skilled in the art upon reference to the detailed description taken in conjunction with the provided figures.

BRIEF DESCRIPTION OF THE DRAWINGS

FIG. 6b is a software flow diagram of the motor control software for the microprocessor of FIGS. 2 and 6a.

FIGS. 9a and 9b are respectively high-level and lower level software flow diagrams of the anti-jamming software for the microprocessor of FIGS. 2 and 6a.

DETAILED DESCRIPTION OF THE PREFERRED EMBODIMENTS

Figure 1:
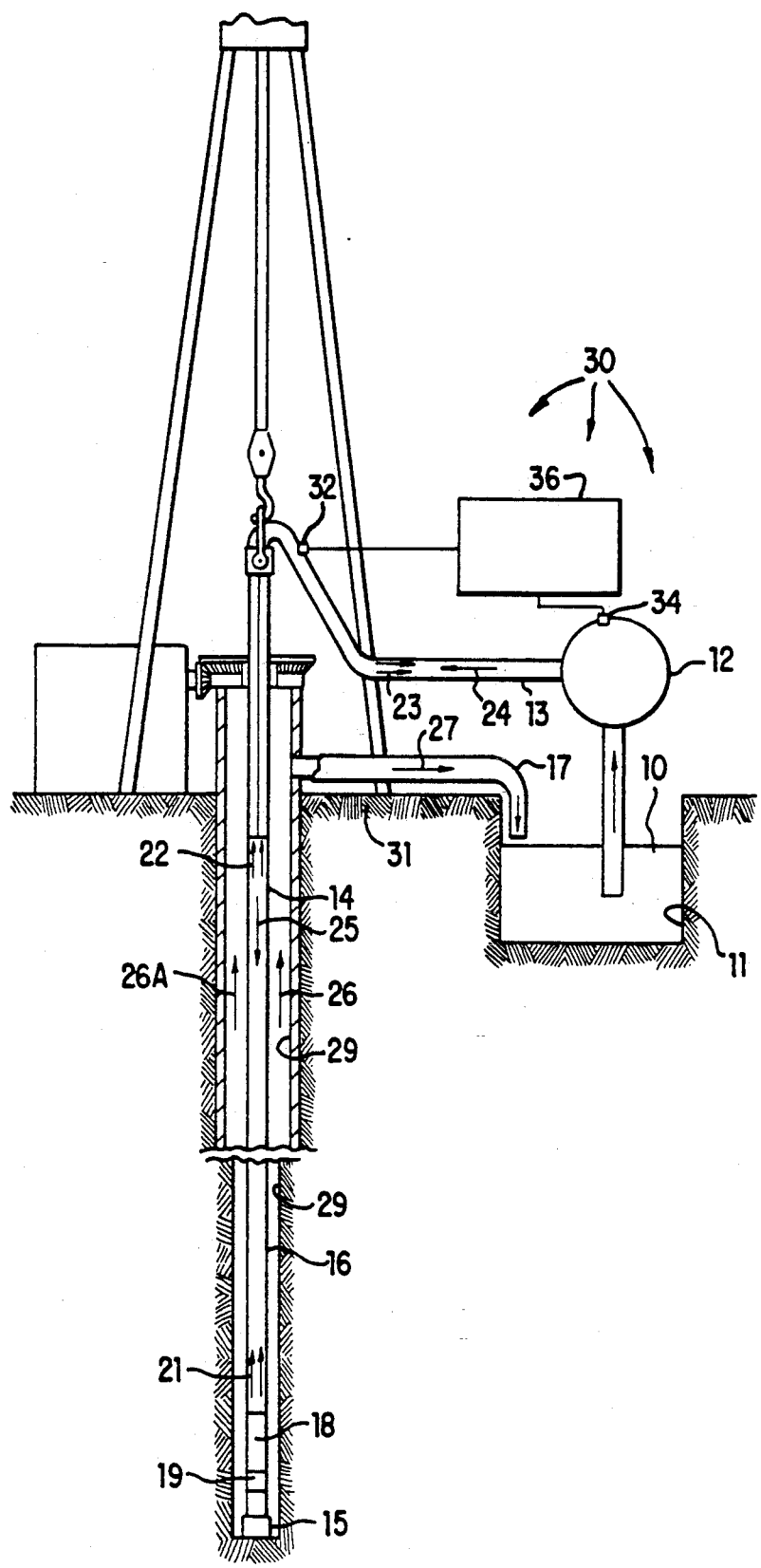
FIG. 1 is a schematic diagram showing a LWD tool in its typical drilling environment.

Referring to FIG. 1, the operation of the present invention in a typical drilling arrangement is illustrated schematically. Drilling mud 10 is picked up from mud pit 11 by one or more mud pumps 12 which are typically of the piston reciprocating type. The mud 10 is circulated through mud line 13, down through the drill string 14, through the drill bit 15, and back to the surface of the formation via the annulus 16 between the drill stem and the wall of the well bore 29. Upon reaching the earth's surface 31, the mud is discharged through line 17 back into the mud pit 11 where cuttings of rock or other well debris are allowed to settle out before the mud is recirculated.

A downhole pressure pulse signaling device 18 is incorporated in the drill string for transmission of data signals derived during the drilling operation by the measurement instrument package 19. A preferred rotor and stator for the signaling device which generates sinusoidal signals is discussed hereinafter with reference to FIGS. 3a, 3b, and 4a-4c, although a similar device disclosed in U.S. Pat. No. 4,847,815 assigned to the assignee hereof may also be utilized. Data signals are encoded in a desired form (also as discussed hereinafter)

by appropriate electronic means in the downhole tool. Arrows 21, 22, and 23 illustrate the path taken by the pressure pulses provided by the downhole signaling device 18 under typical well conditions. Pump 12 also produces pressure pulses in the mud line 13 and these are indicated by arrows, 24, 25, 26 and 26a which also illustrate the flow of the mud through the annulus 16.

In order for the downhole pressure pulse signals to be recovered at the surface, some means is preferably provided to remove or substantially eliminate the portion of the mud pressure signal due to the mud pumps. Subsystem 30, including pressure transducer 32, mud pump piston position sensors 34, and computer or processor 36, comprises one possible such means and is disclosed in detail in copending Ser. No. 07/770,198 now issued as U.S. Pat. No. 4,146,433, which is hereby incorporated by reference herein.

Figures 2, 2A:
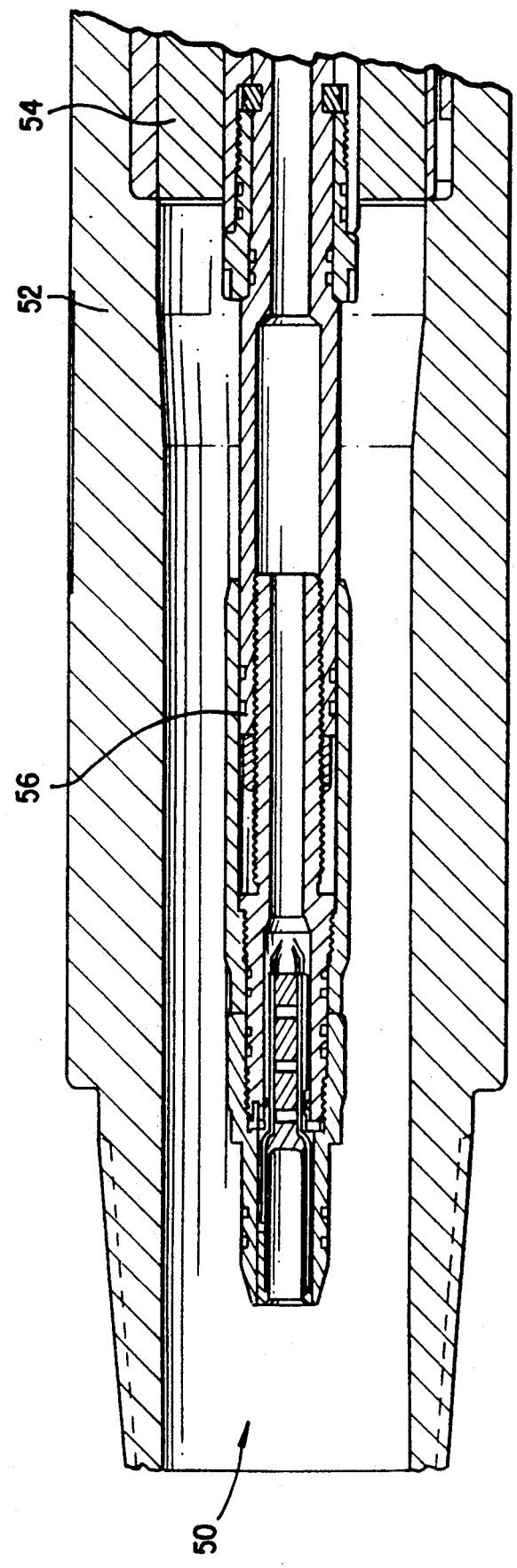
FIG. 2 is a schematic diagram of the LWD tool of the invention which shows how FIGS. 2d-2d relate to each other and also shows other components of the LWD tool.
FIGS. 2a and 2b, and 2c and 2d are respectively partially cut-away perspective representations, and cross sectional representations through portions of the preferred LWD tool of the invention.

Some of the more pertinent details of the LWD tool 50 are seen with reference to FIGS. 2 and 2a-2d. In FIGS. 2a-2d, the tool 50 is seen inside and supported by a drill collar 52. Thus, as seen in FIG. 2a, the tool 50 is provided with a shoulder 54 which supports the tool in the drill collar 52. Also seen in FIG. 2a are a local tool bus extender 56 which provides power and a data link to other sensors.

Figure 2B:
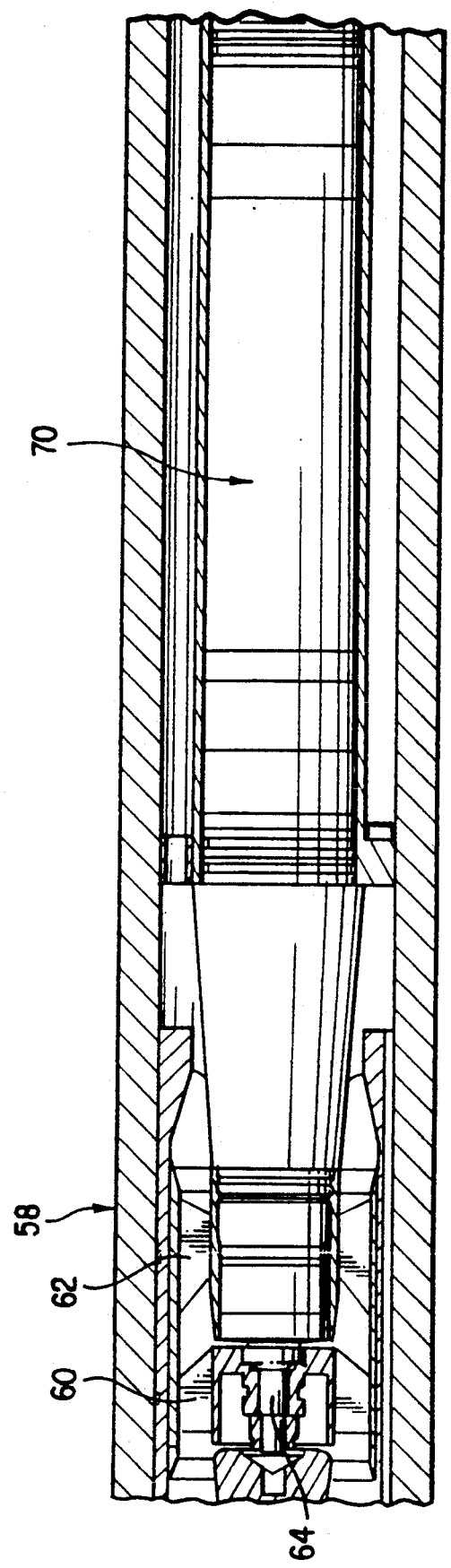

As seen in FIG. 2b, a turbine 58 is provided. The turbine includes a turbine rotor 60, a turbine stator 62, and a turbine shaft 64. The turbine 58 is driven by the mud circulating through the borehole and the LWD tool. As the mud pushes by the turbine 58, the turbine shaft 64 rotates. The turbine shaft 64 is coupled to an alternator 70 which uses the rotating shaft to generate an electric signal which is rectified for driving (powering) the brushless dc servo motor 100 (see FIG. 2c) and allowing the motor 100 to operate.

Turning to FIG. 2, as seen in schematic form, and located between the alternator 70 (of FIG. 2b) and the motor 100 (of FIG. 2c), are a pressure bulkhead 84, sensors 19 (inclinometers, etc.), an electronics package 90 including a microprocessor 91 (details of which will be discussed hereinafter with reference to FIGS. 6a, 6b, 8, and 9a and 9b), and a pressure compensator 92. The pressure bulkhead 84 and compensator 92 keep the electronics package 90 and sensors 86 at or near atmospheric pressure so that they may function properly.

Figure 2C:
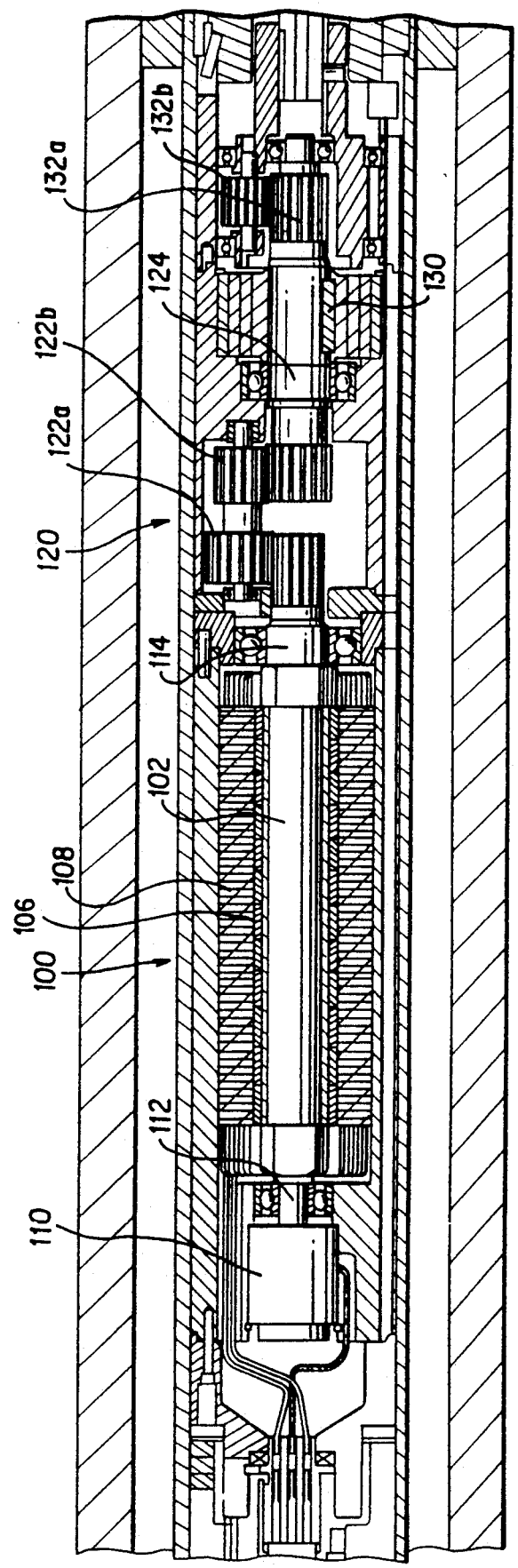
Figure 2D:
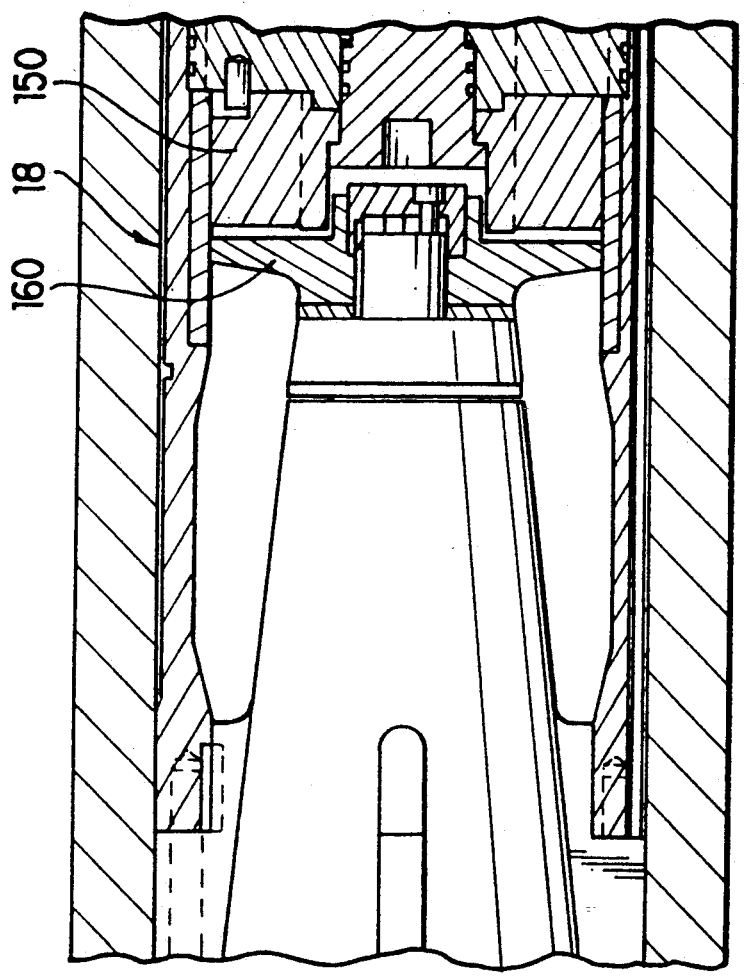

The brushless dc servo motor 100 which drives the rotor 160 (see FIG. 2d) of the LWD tool 50 is seen in FIG. 2c. In the preferred embodiment, the motor is a motor available from MOOG of East Aurora, N.Y. under part #303F052, and includes a motor shaft/rotor 102, magnets 106, and a motor stator 108. Details of similar types of motors are obtained from Kenjo, T., and Nagamori, S., *Permanent-Magnet and Brushless DC Motors* (Monographs in Electrical and Electronic Engineering 18); Oxford Science Publications: Clarendon Press (Oxford 1985, pp. 194), which is hereby incorporated by reference herein in its entirety. On the tail end 112 of shaft 102 of the motor is located a position sensor 110 sold under part #JSSBH-15-C-1/P137 by the Clifton Precision subsidiary of Litton Systems, Inc., Clifton Heights, PA. Details of similar types of position sensors are obtained from Engineering Staff of Clifton Precision, "Synchro and Resolver Engineering Handbook", Litton, Clifton Precision (1989), which is also hereby incorporated by reference herein in its entirety. The function of the position sensor 110 is to determine exactly how far the shaft 102 has rotated. Preferably, position sensor 110 resolves a single rotation of the shaft into four thousand ninety-six counts (twelve bits).

The driving end 114 of shaft 102 is coupled to a gear train 120 which reduces the rotation by a factor of eight. The first gears 122a and 122b of the gear train effect a 2:1 reduction in rotation speed. Located on the shaft 124 coupled to gear 122b is a magnetic positioner 130, discussed in detail hereinafter with reference to FIG. 5. The function of the magnetic positioner 130 is to prevent the modulator 18 (seen in FIG. 2d) from getting stuck in a closed position, and thereby preventing mud from circulating up through the LWD tool and driving the turbine 58. However, according to one aspect of the invention (discussed with reference to FIG. 7f), the arrangement of the magnetic positioner 130 is also used as an aid to the motor causing a modulation in a generated signal.

As seen in FIG. 2c, gear train 120 also includes gears 132a and 132b which effect a further 4:1 reduction in rotation speed of the shaft. Thus, the rotor 160 seen in FIG. 2d, rotates one time for every eight revolutions of the motor 100. Because the rotor 160 (as discussed in more detail with reference to FIGS. 3a, 3b, and 4a-4c) has four lobes, one full rotation of the rotor 160 relative to the stator 150 of FIG. 2d generates a signal approximating four sinusoids. With the eight to one reduction, two revolutions of the motor 100 are required to generate a single sinusoid from the modulator 18 which includes the rotor 160 and stator 150 together.

Figure 3A:
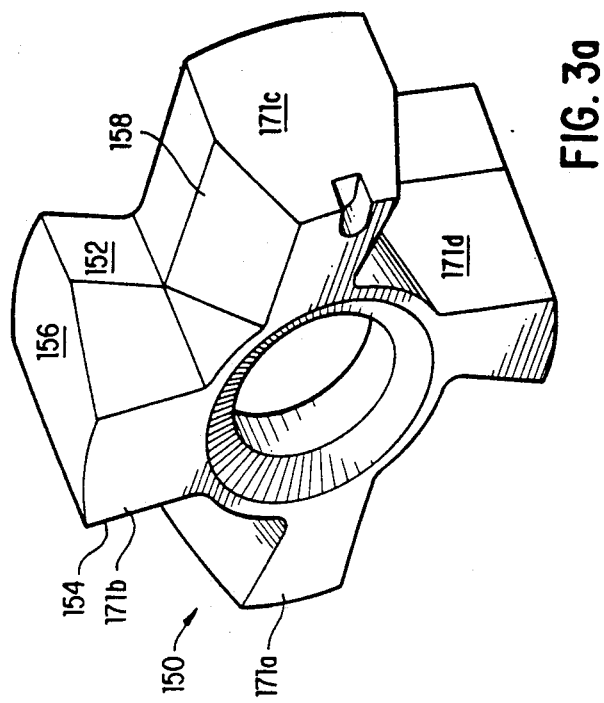
FIGS. 3a and 3b are respectively isometric and front plan views of the preferred stator of FIG. 2d.
Figure 3B:
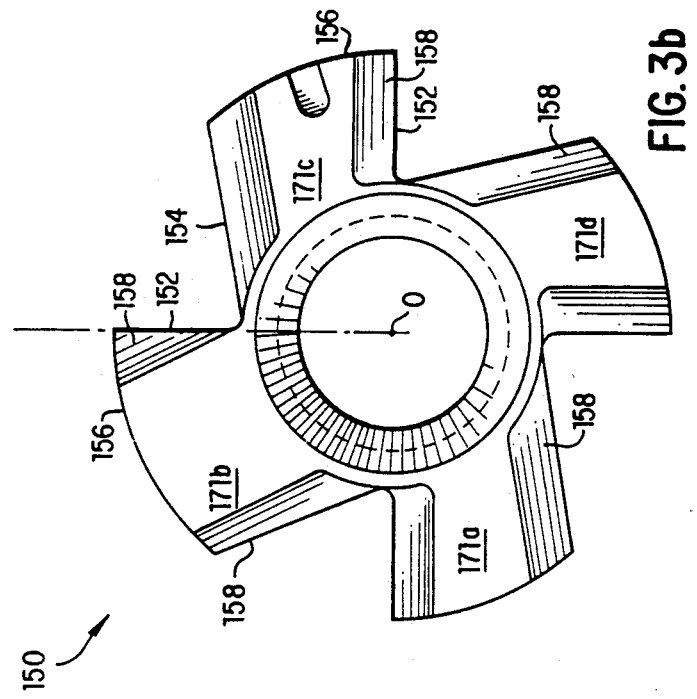

FIGS. 3a and 3b are respectively isometric and front plan views of the preferred stator 150 of the invention. The stator 150 and the rotor 160 (shown in FIGS. 4a, 4b, and 4c) generally comply with the teachings of U.S. Pat. No. 4,847,815 and generate sinusoidal waves. In particular, the stator 150 is seen with four lobes 171a, 171b, 171c, and 171d. Each lobe has a first side 152 a second side 154 and an outer edge 156. As seen in FIG. 3b, the first side 152 is radial from the origin O of the stator. However, instead of the second side 154 of the lobe being parallel with the first side 152 (as taught in the preferred embodiment of U.S. Pat. No. 4,847,815), as shown in FIG. 3b, they are at an angle of approximately thirteen degrees relative to each other. Also, as shown in FIG. 3b, but seen better in FIG. 3a, the lobes 171 of the stator are undercut at an angle as seen at 158.

Figure 4A:
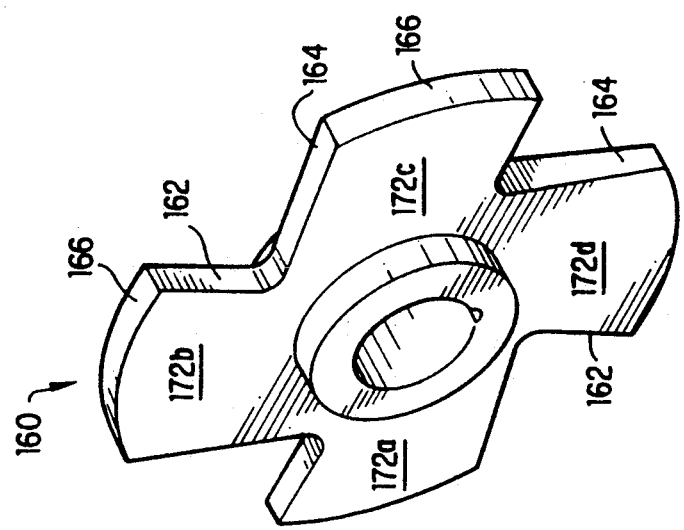
FIGS. 4a, 4b, and 4c are respectively isometric, front plan, and side elevational views of the preferred rotor of FIG. 2d.
Figure 4C:
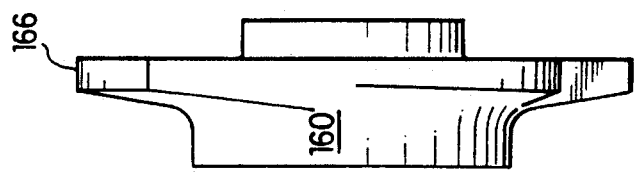
Figure 4B:
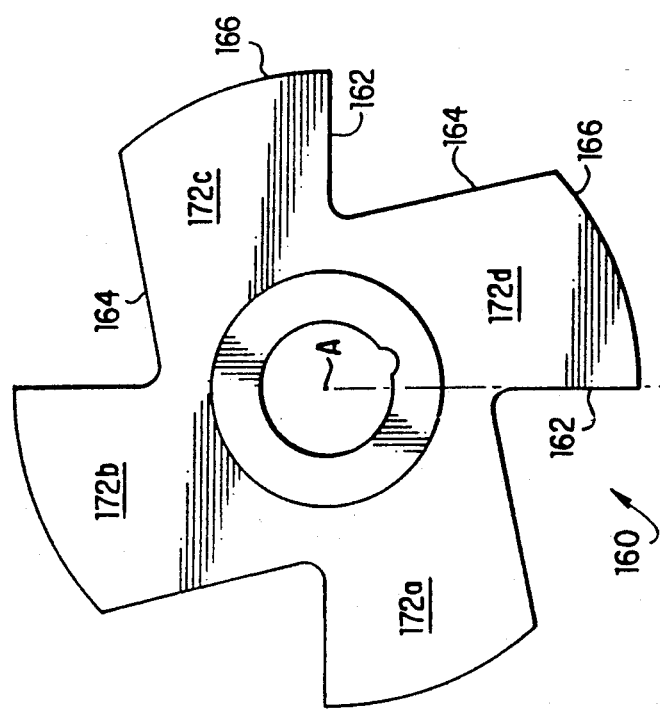

Turning to FIGS. 4a, 4b, and 4c, isometric, front plan, and side elevational views of the preferred rotor 160 are seen. The rotor 160, as discussed above with reference to FIGS. 2a-2d is coupled to a drive shaft which rotates the rotor 160 relative to the stator 150, thereby generating a signal. As with the stator 150, the rotor 160 has four lobes 172a, 172b, 172c, and 172d. Each lobe has a first side 162, a second side 164, and an outer edge 166. As seen in FIG. 4b, the first side 162 is radial from the origin A of the rotor. The second side 166 of the lobe is at an angle of approximately thirteen degrees relative to the first side 164. With the provided geometry of the stator 150 in conjunction with the similar geometry of the rotor 160, when the rotor is at a steady speed, the orifice between the rotor and the stator varies in time substantially with the inverse of the square root of a linear function of a sine wave (as discussed in detail in U.S. Pat. No. 4,847,815). The resulting signal is therefore generally sinusoidal in nature.

Figure 5:
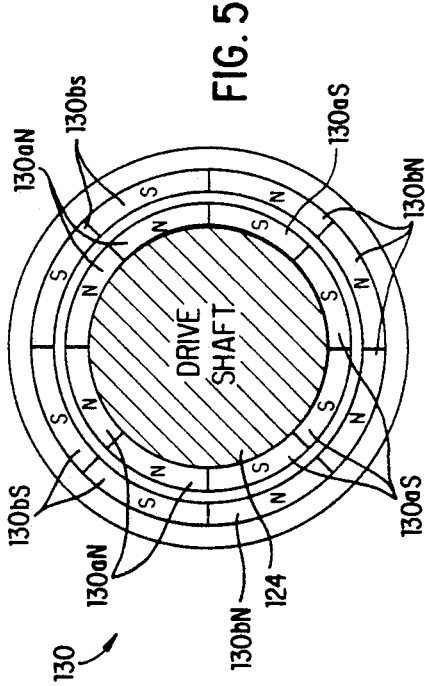
FIG. 5 is a cross sectional view of the magnetic positioner of FIG. 2c.

FIG. 5 is a cross sectional view of the magnetic positioner 130 of FIG. 2c. The magnetic positioner is simply comprised of four sets of magnets 130aS, 130aN, 130bS and 130bN. Two of the four sets of magnets 130aS and 130aN are coupled to the drive shaft 124 and rotate therewith. Inner magnets 130aS, as shown are "south" polarity magnets and extends one hundred eighty degrees around the drive shaft 124, while magnets 130aN, are "north" polarity magnets which extend the other one hundred eighty degrees around the drive shaft 124. Axially displaced from and surrounding magnets 130aS and 130aN, and fixed to the housing 130c of the magnetic positioner are outer magnets 130bS and 130bN. Outer magnets 130bS (south polarity magnets) extend one hundred eighty degrees around magnets 130aS and 130aN, and outer magnets 130bN (north polarity) extending the other one hundred and eighty degrees around the inner magnets.

With the magnetic positioner 130 as provided, the rotor 160 is prevented from getting stuck in a closed position relative to the stator 150, and thereby preventing mud from circulating down through the LWD tool and driving the turbine 58. In particular, during jamming (such as discussed hereinafter in detail with reference to FIG. 9), or during a power-down state, the magnets of magnetic positioner 130 will try to align themselves as shown in FIG. 5, with the south polarity inner magnets 130aS opposite the north polarity outer magnets 130bN, and the north polarity inner magnets 130aN opposite the south polarity outer magnets 130bS. The alignment of the magnets, causes the drive shaft 124 to rotate from whatever position it was in, to the position of FIG. 5. The rotation of the drive shaft in turn causes the rotor 160 to rotate. By placing the rotor 160 on its drive shaft in an "open" orientation relative to the stator 150 when the magnets are aligned as shown in FIG. 5, whenever the magnets return to the position of FIG. 5, the rotor 160 will be open relative to the stator 150. It will be appreciated that because of the 4:1 step down in gears (reduction), a one hundred eighty degree rotation of the drive shaft 124 of the magnetic positioner, will only effect a forty-five degree rotation of the drive shaft of the rotor 160. However, because the rotor 160 has four lobes, a forty-five degree rotation causes a rotor in a fully closed state to rotate into a fully open state.

As aforementioned, the turning of the rotor 160 of the modulator 18 generates a sinusoidal signal. In order to generate a signal which can be used to transmit downhole data to the surface equipment for detection, processing, and decoding, the rotation of the rotor 160 is controlled by the motor 100 which in turn is controlled by the microprocessor 91. In the preferred embodiment, the microprocessor 91 is programmed in order to permit the modulator to generate any carrier frequency up to 24Hz, using either phase shift keying (PSK) type coding, on/off keying, frequency shift keying (FSK) type coding, or other encoding methods. In accord with the invention, the two preferred coding techniques are PSK type and FSK type. In phase shift keying (whether differential (D)PSK, bipolar (B)PSK, quaternary (Q)PSK or other such as OPSK) and as will be described in more detail with reference to FIGS. 7a-7d, the phase of the signal at predetermined points in time is determined. Depending upon the detected phase, a value is assigned. In DPSK and BPSK encoding, data bits of value 0 or 1 are transmitted regularly, while in QPSK and OPSK more than two values are allowed (thereby providing two or more bits of data per signal period). Likewise, in different types of frequency shift keying, values of 0, 1, ... are assigned, as the frequency of the signal at predetermined points in time is determined, and based upon the detected frequency and the number of frequencies allowed, the value is assigned. Thus, if eight different operating frequencies are allowed, three bits of information may be sent during each signal period by insuring that the desired operating frequency is being transmitted at the appropriate time. Regardless of the type of coding utilized, the frequency or frequencies at which the signals are sent is determined according to the invention as described hereinafter with reference to FIG. 8.

Figure 6A:
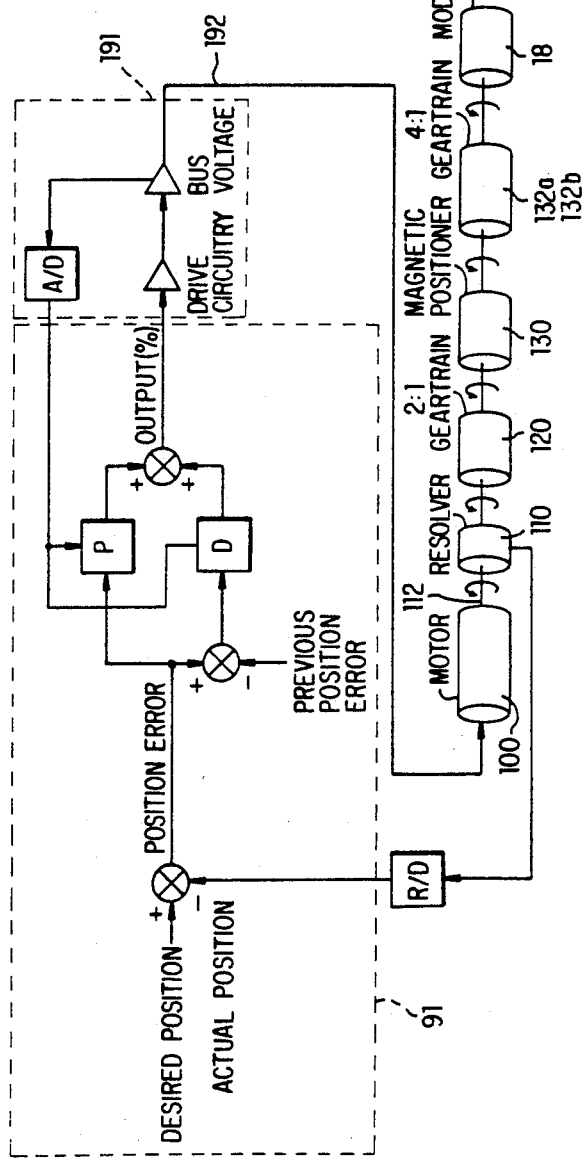
FIG. 6a is a block diagram of the motor drive apparatus and motor controller function of the invention.

In order to change the phase and/or frequency of the signal, the rotation of the rotor 160 is controlled by the motor 100. In turn, the rate at which the motor turns is controlled by a drive controller 191 (seen in FIG. 6a) under instructions of the microprocessor 91. An overview of this system is seen in FIG. 6a. As seen in block diagram form in FIG. 6a, and previously discussed with reference to FIG. 2c, coupled to the motor 100 (and typically on the motor shaft 102) is the position sensor or resolver 110. The shaft 102 is stepped down by a 2:1 geartrain 120 to which the magnetic position 130 is coupled. Another geartrain 132 is used to provide an additional 4:1 step down in rotation, and the four-lobed modulator 18 is coupled thereto. As seen in FIG. 6a, the output of the position sensor 110 is provided to the microprocessor 91. The microprocessor, in turn, provides a duty cycle signal to the motor controller 191 which effectively pulse width modulates a dc power bus 192 to the motor 100, thereby controlling the speed of the motor. Thus, a feedback arrangement is set up, whereby if the motor moves the rotor too much (as sensed by the position sensor 110), the duty cycle is reduced by the microprocessor 190 and the drive signal of the controller 191 is reduced; while if the motor does not move the rotor enough, the duty cycle is increased, and the drive signal of the controller 191 to the motor 100 is increased.

Controlling the modulator over varying mud flow rates and mud densities requires the motor software to perform several tasks in order to ensure the generation of a readable signal. In particular, the voltage produced by the alternator is roughly proportional to the flow rate, while the load on the modulator increases with increasing flow rate and mud weight. In order to control the modulator, an adaptive PD control algorithm is used for the motor (with a proportional—P term, and a derivative—D term), with gains being constantly adjusted to compensate for the varying bus voltages and loads encountered. It will be appreciated that while an adaptive PD control algorithm is preferred, other control algorithms known in the art can also be used.

Figure 6B:
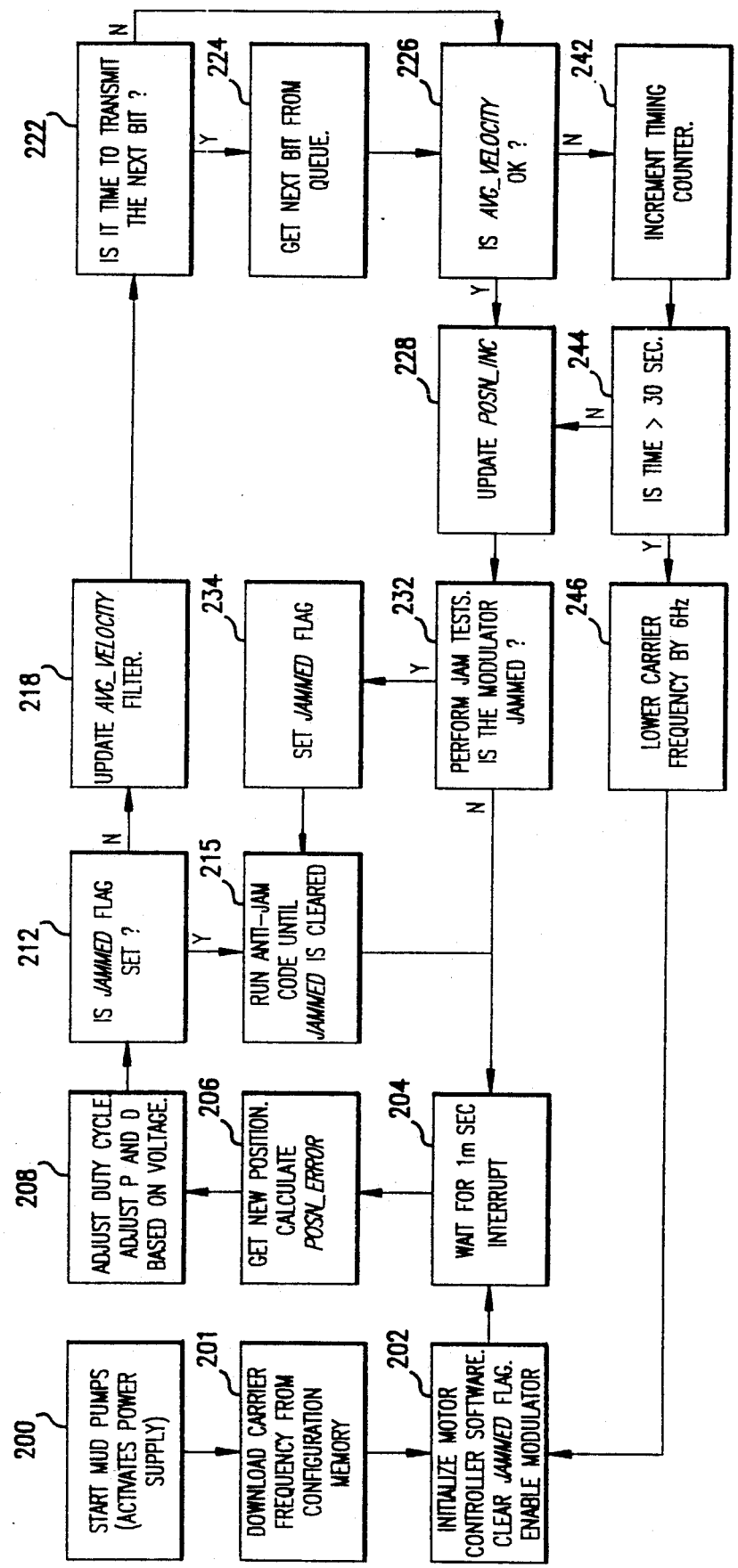

In FIG. 6b, a high level software flow diagram is seen of the motor control software for the microprocessor 91 of FIGS. 2 and 6a. Prior to initialization (step 202), at 200, the mud pumps are started which activates the power supply (via the turbine, alternator, etc.) At step 201, the carrier frequency (if in PSK mode) or frequencies (if in FSK mode) are downloaded from the configuration memory which accompanies the microprocessor 91. Alternatively, if the carrier frequency or frequencies are determined uphole (as described hereinafter with reference to FIG. 8), that information is transmitted downhole to the microprocessor and stored thereby. At step 202, the microprocessor initializes the motor controller software, clears the jammed flag (discussed hereinafter with reference to FIGS. 9a and 9b), and enables the modulator. The initialization routine performs the functions of setting variables to known states, as well as performing one time calculations of determining velocity profiles, and determining what position to begin a phase shift for a given carrier frequency.

The initialization calculations conducted are best understood with reference to a brief review of the motor, position sensor, and modulator details as discussed above with reference to FIGS. 2c and 6a. In particular, the position sensor 110 is mounted on the motor 100 and resolves a single rotation of the shaft into four thousand ninety-six counts (twelve bits). The motor is coupled to the magnetic positioner 130 via a 2:1, gear train 122, and the magnetic positioner 130 is coupled to the four-lobed modulator 18 via a 4:1 gear train 132. Based on this configuration, a thirteen bit software counter called signal$_{13}$ posn (signal position) is used by the microprocessor to keep track of the 8192 resolver counts needed to complete one complete revolution of the magnetic positioner which also corresponds to one quarter revolution of the modulator. Since there are four lobes on the modulator, a sonic cycle is produced each quarter revolution of the modulator. Thus, in the preferred embodiment, one sonic cycle produces 8192 counts in signal—posn. A signal—posn of zero indicates that the modulator blades are in the fully open position, while a count of 4096 indicates that the modulator blades are in a fully closed position. The initialization routine uses these counts plus the fact that the motor controller interrupt routine is run at one millisecond intervals to produce velocity profiles.

Based on the signal—posn count, a variable called posn—inc (position increment) is used to indicate the desired position and correspondingly the velocity of the modulator by providing an indication to the microprocessor regarding how far (how many counts) the motor shaft should be turned each millisecond. To send a pure sine wave at a given carrier frequency, posn—inc is held constant, and thus, the motor is kept turning at a constant speed. The posn—inc value (per millisecond) for a pure sine wave is based on the carrier frequency according to the equation:

$$\text{posn\_inc} = 8192 \, (\text{carrier\_frequency})/1000 \quad (1)$$

Thus, when using PSK encoding, when a value zero is being sent, and the motor is in a steady state operation, the posn—inc is set according to equation (1) above. However, when a value one is being sent, a one hundred eighty degree phase shift must be introduced into the carrier signal. To do this, the motor must slow down long enough to accumulate a one hundred eighty degree phase shift and then return to full speed. In the preferred embodiment of the invention, the phase shift is accomplished in a sixty millisecond interval during which time the posn—inc variable is controllably changing according to a predetermined table and dictating the desired velocity of the modulator.

Figure 7A:
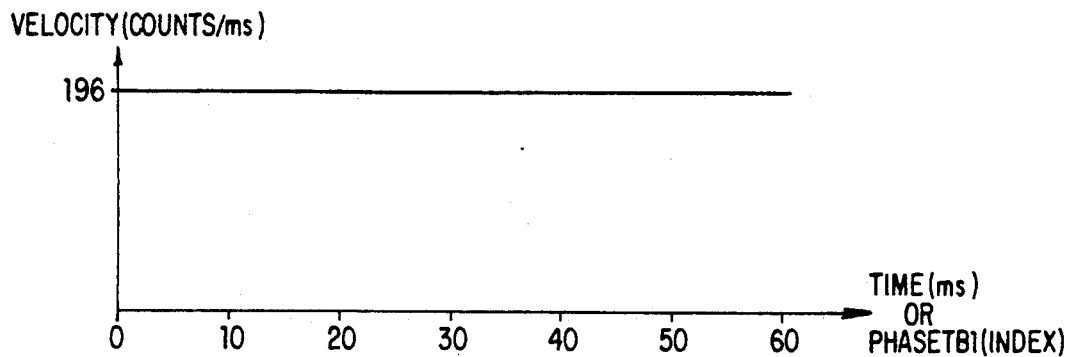
FIGS. 7a-7c are graphs which show rotor velocity over time for a full speed velocity profile, a zero speed referenced velocity profile, and a phase shift velocity profile respectively.
Figure 7B:
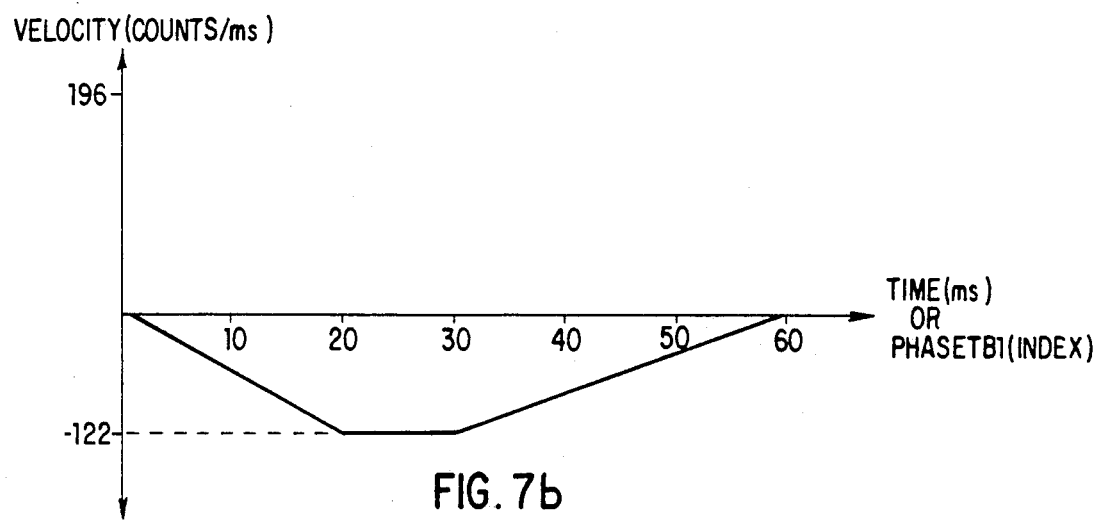
Figure 7C:
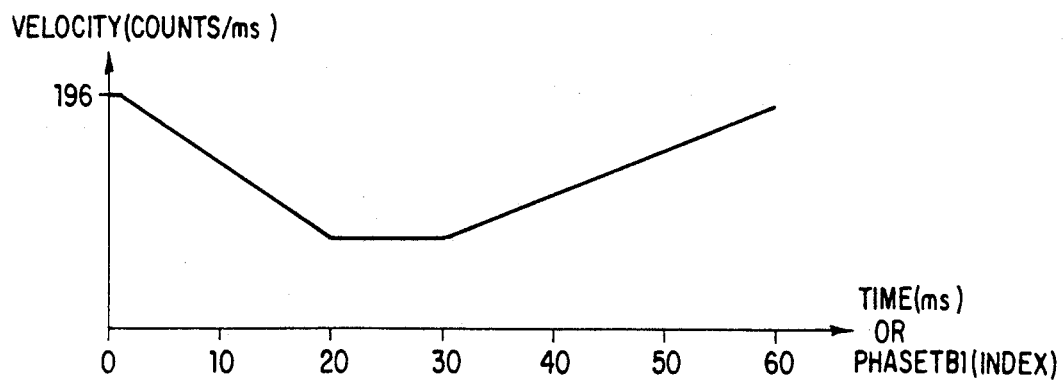

The table according to which the posn—inc variable is changed is generated by using equation (1) above to determine the full speed velocity, and then adding a zero-speed reference phase table to this value to produce a final table called phasetbl. Every element in phasetbl indicates a desired velocity during a one millisecond interval. Thus, the full speed velocity as defined by equation (1) above is shown in FIG. 7a where a steady velocity of one hundred ninety-six counts per millisecond provides an approximately 24Hz signal (196,000/8192=23.926). In order to phase shift by one hundred eighty degrees during sixty milliseconds, 4096 counts must be "lost" in that time frame. Thus, FIG. 7b provides a "zero speed velocity profile" which shows the number of counts being lost each millisecond over the sixty millisecond interval. It will be appreciated that the integral under the curve of FIG. 7b amounts to −4096 counts. Adding the full speed profile to the zero speed profile generates the final phase table of FIG. 7c. As seen in FIG. 7c, the velocity decreases over an approximately twenty-one millisecond interval from one hundred ninety-six counts per millisecond to about seventy-four counts per millisecond; stays steady at about seventy-four counts per millisecond for about eight milliseconds, and then increases back to one hundred ninety-six counts per millisecond over the next thirty-one milliseconds or so. The final phase table of FIG. 7c is stored in memory local to the microprocessor and is used by the microprocessor to set the posn—inc values when a bit value one must be sent. It will be appreciated by those skilled in the art that phase tables other than shown in FIG. 7c could likewise be utilized.

The second initialization determination relates to a decision as to what positions the motor and modulator position should be at upon beginning a phase shift. While the motor 100 and modulator 18 could be at any position at the beginning of a phase shift, it is preferred, in accord with the preferred embodiment of the invention, that the magnetic positioner 130 of the tool be used to assist in the phase shift. Hence the motor and modulator position at which the phase shift is started is based on the magnetic positioner position with the positioner designed to be stable when the modulator is in the open position. During phase shifts, the mass of the rotating components must be accelerated and decelerated very quickly. By timing the phase shifts properly, the forces from the magnetic positioner 130 are used to assist the motor in accomplishing the acceleration and deceleration. In particular, the preferred magnetic positioner 130 of the invention as shown in FIG. 5 exerts a sinusoidal torque ranging from minus seventy-five to plus seventy-five inch-pounds. As aforedescribed, when the magnets of the magnetic position 130 are all aligned with magnets facing magnets of opposite polarity, the modulator 18 is in the fully open position, and the resolver count is zero. When the magnets of the magnetic position 130 are lined up with each magnet facing a magnet of the same polarity, the modulator 18 is in the fully closed position, and the resolver count is 4096. When rotating from 0 to 4096 counts, the magnetic positioner opposes the rotation, while when rotating from 4096 to 8192 counts, the positioner aids in the rotation. Thus, in accord with the preferred embodiment of the invention, the starting portion of a phase shift where deceleration is required is arranged to occur when the magnetic positioner opposes rotation (i.e., the resolver is between 0 and 4096 counts), while the ending portion of the phase shift where acceleration is required is arranged to occur when the magnetic positioner aids in rotation (i.e., the resolver is between 4096 and 8192 counts).

Figure 7D:
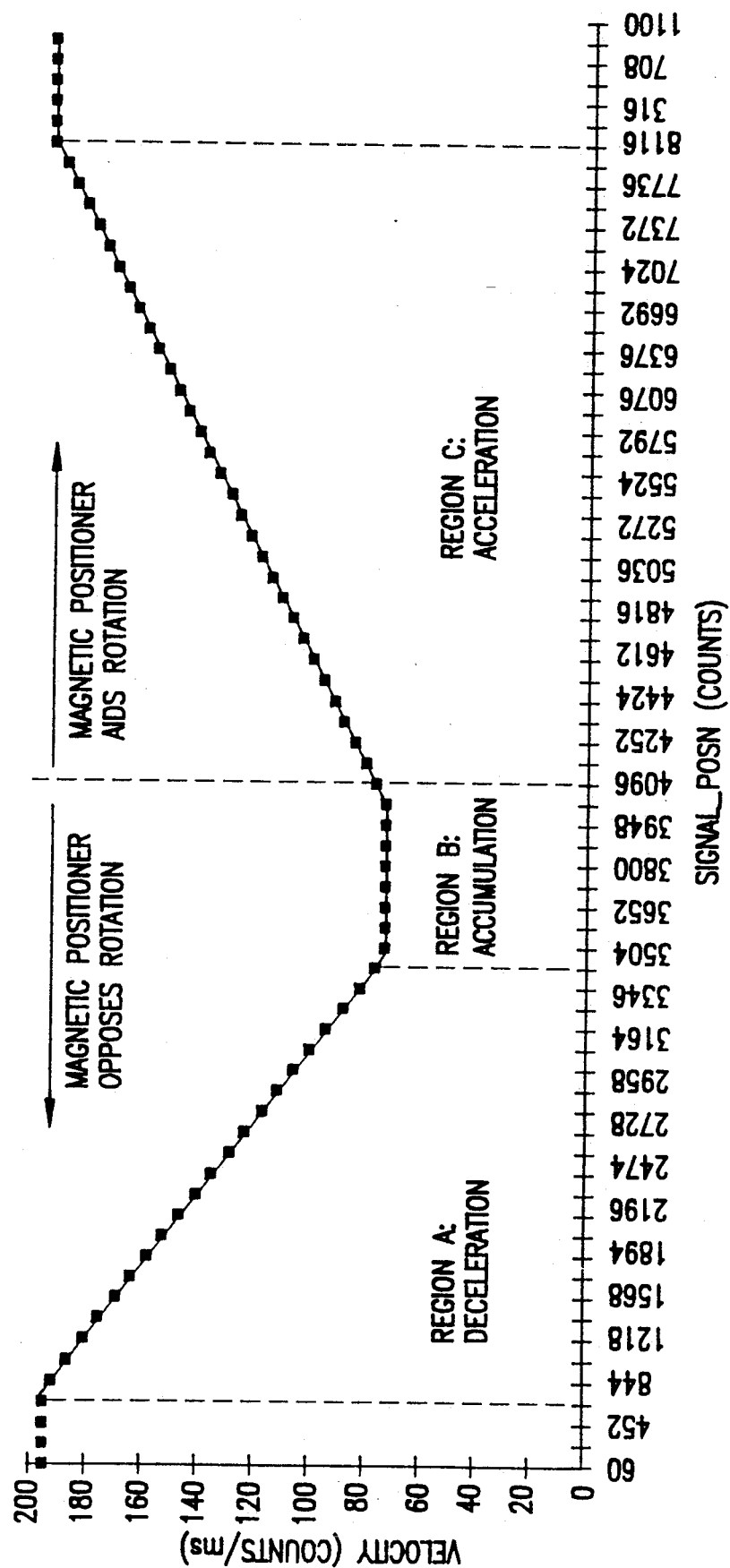
FIG. 7d is a graph which shows rotor velocity versus rotor position relative to a magnetic positioner for a phase shift velocity profile assisted by the magnetic positioner.

Turning to FIG. 7d, the velocity profile of FIG. 7c for generating a phase shift is shown with the horizontal axis being the resolver count (signal—posn) instead of time, and with the profile of FIG. 7c being offset in time to provide the preferred timing for the phase shift. As discussed above with reference to FIGS. 7a-7c, during a phase shift, 4096 counts are "lost". Thus, of the approximately 11,760 counts of the full speed velocity profile over sixty milliseconds, 4096 counts are lost, and approximately 7664 counts are counted during a phase shift (the phase shift starting at count 452 and ending at count 8116 of FIG. 7d). In positioning the phase shift relative to the magnetic positioner, the start of the acceleration portion of the phase shift is made to approximately coincide with count 4096 of the resolver when the magnetic positioner aids rotation. Since approximately 4020 counts occur during the acceleration (as determined by integrating under the acceleration portion of the curve of FIG. 7c), the acceleration is shown ending at count 8116 of FIG. 7d. Likewise, since deceleration is made to occur when the magnetic positioner opposes rotation, the deceleration is shown starting at about count 648 and continuing until approximately count 3426.

Returning to FIG. 6b, after initialization, at step 204, the microprocessor waits one millisecond for an interrupt; i.e., every millisecond it reruns its routine. Then, at step 206, and with reference to FIG. 6a as well as FIG. 6b, based on the carrier frequency desired, it calculates the desired position of the motor 100 (see step 228 discussed hereinbelow), reads the actual motor position as sensed by the position sensor 110, and calculates a position error (position_error) according to:

$$\text{position\_error} = \text{desired\_position} - \text{actual\_position} \tag{2}$$

At 208, the position error is compared against the previous position error to provide a delta position error or derivative term according to:

$$\Delta\text{position\_error} = \text{position\_error}[k] - \text{position\_error}[k-1] \tag{3}$$

where k is a k'th sampling time, and k-1 is the previous sampling time to the k'th sampling time. The derivative and proportional terms are used at 208 according to an adaptive PD control as discussed below to determine the new duty cycle according to:

$$\text{output}(\%) = P(\text{control\_variable}) + D(\Delta\text{control\_variable}) \tag{4}$$

where the control_variable for the controller "constant" P is the position_error as determined in equation (1), and the delta control_variable for the controller "constant" D is the delta position_error as determined in equation (2). Thus, in accordance with the preferred embodiment of the invention, the new duty cycle is set according to:

$$\text{output}(\%) = P(\text{position\_error}) + D(\Delta\text{position\_error}) \tag{5}$$

where the duty cycle signal (output%) constitutes the output signal of the microprocessor 91. The duty cycle output signal is then taken by the controller 191 and used to drive the motor.

As previously discussed, the desired position of the modulator is determined by the signal encoding method being used, and the signal which is to be sent. One skilled in the art will appreciate that using the adaptive PD control system described above, the system operates with a non-zero, but finite position error which manifests itself as a lag between desired position and actual position.

As seen primarily with reference to FIG. 6a, the loop gain of the system is proportional to the microprocessor's output drive signal (output%), as well as the bus voltage of the system. Since the tool of the preferred embodiment operates over a wide mud flow range, the bus voltage can vary greatly. To maintain a constant loop gain for a given position error, "constants" P and D vary inversely with the bus voltage. This is the adaptive part of the "adaptive PD" control algorithm, which serves to produce an optimal modulator response over a range of flow rates. Equations for these adjustments are:

$$P = K_P(\text{bus\_voltage}) + K_{Poffset} \tag{6}$$

$$D = K_D(\text{bus\_voltage}) + K_{Doffset} \tag{7}$$

where $K_P$ and $K_D$ are negative constants, and $K_{Poffset}$ and $K_{Doffset}$ are positive constants. The constants in equations (6) and (7) depend on the electromechanical characteristics of the system and vary greatly depending upon implementation.

The method of controlling the modulator allows for great versatility in choosing an encoding method. Because the microprocessor reads the motor position and executes the software at regular intervals, the software can control the rotational speed of the modulator. For example, if the control software is executed every millisecond, and the desired signal is to be a 24Hz sine wave, the software can advance the desired position each millisecond using the following formula:

$$\text{desired\_position} = \text{desired\_position} + (24 \text{ cycle/sec})(90 \text{ deg/cycle})(1/1000 \text{ sec/Ms})(1 \text{ Ms}) \tag{8}$$

where desired_position is expressed in degrees measured at the modulator. The 90 deg/cycle element of equation (8) comes from the fact that in the preferred embodiment of the invention, a single sonic cycle is generated by one quarter turn of the modulator rotor as previously discussed.

Figure 9A:
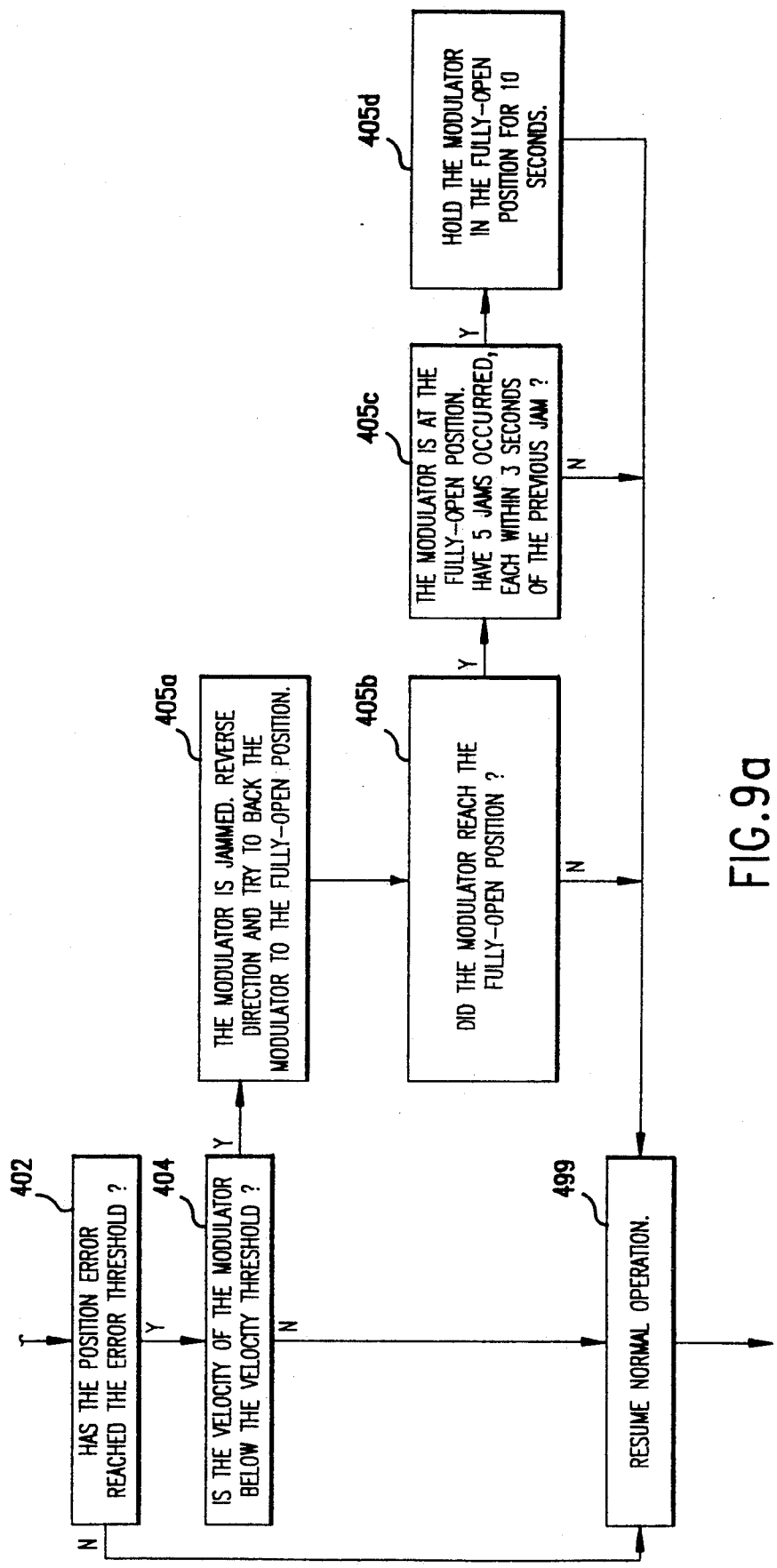
Figure 9B:
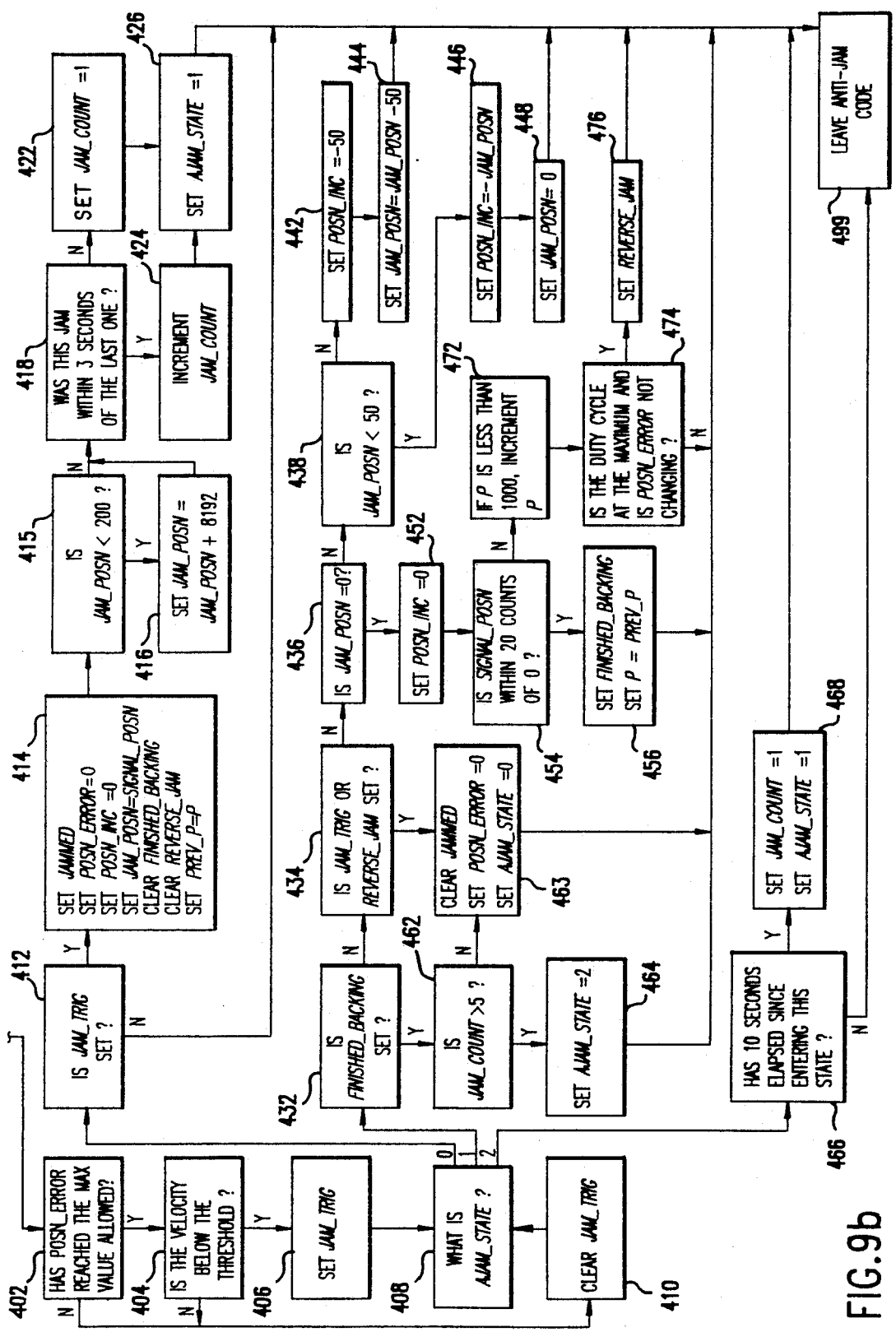

Returning to FIG. 6b, at step 212, the "jammed" flag discussed hereinafter with reference to FIGS. 9a and 9b is read to determine whether it is set. If it is set, the anti-jam code (see FIG. 9b) is run at 215 until the jammed flag is cleared. During the attempt to unjam the rotor, the microprocessor will continue to run through the cycle of steps 204 through 215. If, on the other hand, the jammed flag is not set at step 212, then at step 218, variables for the average velocity filter (avg_velocity) are updated. As discussed hereinafter, the average velocity of the motor is used in order to determine whether or not to lower the carrier frequency. Thus, the average velocity filter is a low-pass filter used to remove the effect of three disturbances on the system. A first disturbance is that the magnetic positioner adds ripple to the actual velocity of the modulator due to the acceleration and deceleration it adds. So, the average velocity filter is provided with a time constant great enough to remove the ripple (by way of example only, the time constant may be set equal to three times that of the carrier frequency). A second disturbance occurs during a phase shift (in PSK encoding systems) where the velocity changes greatly. A third disturbance occurs during a jam. In order to remove undesired effects of phase shift and jam occurrences on the system, the average velocity filter is not updated during phase shifts or jams.

Once the average velocity has been calculated, at 222, a determination is made as to whether it is time to send an additional bit of information. A bit period is generally several sonic cycles in length, and is dependent on the number of sonic cycles per bit and the carrier frequency. For example, with a carrier frequency of 24Hz, or twenty-four cycles per second, and with four sonic cycles per bit, a bit period will be one-sixth of a second. In order to determine whether there is a new bit period, the software initializes a down-counter at the beginning of each bit period, and decrements the counter every millisecond. When the counter reaches zero, the next data bit (as determined from sensors in the LWD tool in conjunction with other parts of the microprocessor program) is popped from the queue and a new bit period begins. Based on the value of the bit, the modulator's next position is determined.

Returning to step 222, if it is time to transmit the next bit, at step 224 a bit is taken from the queue. Then, at 226, the filtered average velocity calculated at step 218 is checked. Also, even if it is not time to transmit a next bit, at 226, the average velocity is checked. If the average velocity is as expected, then at step 228, the posn_inc variable which is used to calculate the location of the motor's next position is updated. In PSK encoding, when the data bit to be transmitted is a zero, then to send a pure sine wave, the motor should turn at a constant speed. Thus, in steady state operation, the increment in position for each millisecond should be equal to 8192 (the number of sensed positions in one turn of the motor shaft) times the carrier frequency divided by one thousand (see equation 1 above). When the data bit to be transmitted is a one, however, in PSK encoding, a phase shift is required, and hence the increment in position must be determined otherwise as discussed above with reference to FIGS. 7a-7d. Regardless, the updated posn_inc variable is used by the microprocessor to determine what the new position should be for step 206.

Once the posn_inc variable has been updated, at step 232 the microprocessor performs jam tests as discussed hereinafter with reference to FIGS. 9a and 9b. If the modulator is not jammed, the program continues at step 204 with the one millisecond interrupt. If the modulator is jammed, then at step 234 the jammed flag is set, and at 215, the anti-jam code is run. Then the program continues at step 204 at the one millisecond interrupt.

Returning to step 226, if the filtered average velocity (avg_velocity) is not as expected such that it falls below the desired velocity by a predetermined amount (e.g., four counts per millisecond), then at step 242, a flag is set and the microprocessor starts counting. During a preset time period (e.g., thirty seconds) the program continues as before, with the posn_inc variable being updated at 228, the jam tests being performed at 232, etc. However, if the modulator is not jammed, and the average velocity stays below the desired velocity for a the preset time period as determined at 244, then at 246, the carrier frequency of the tool is preferably lowered. The program then continues at step 202 with the reinitialization of the motor controller software. By lowering the carrier frequency, the motor is run at a lower speed, and less power is required.

Figure 7E:
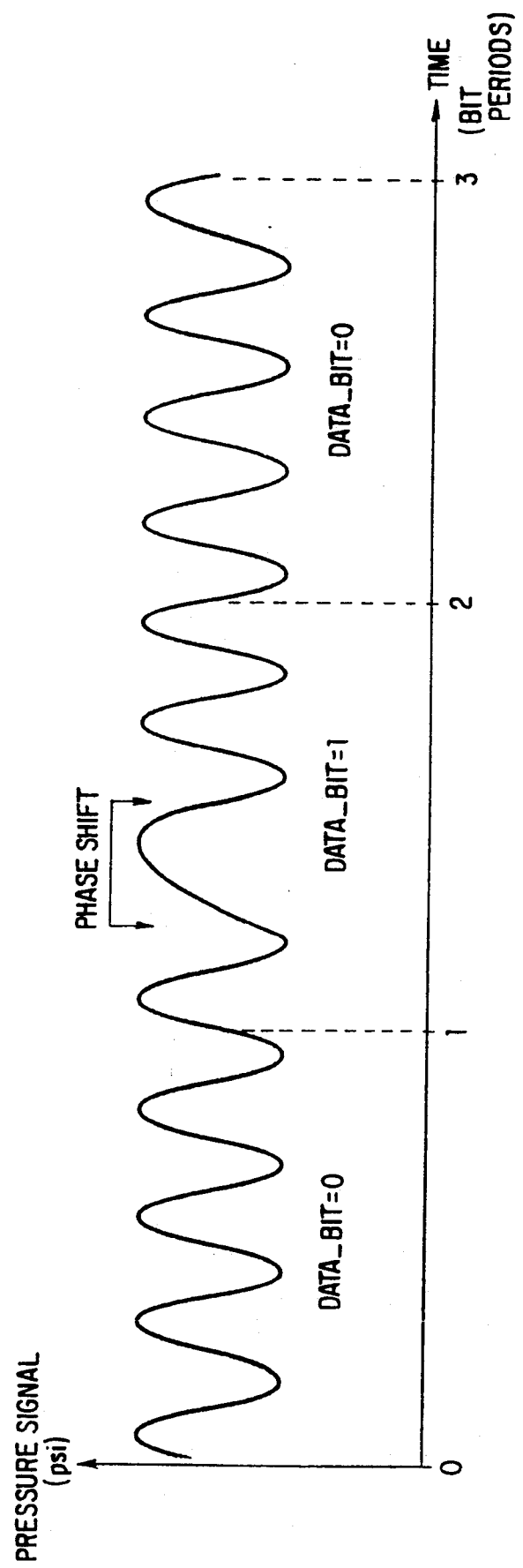
FIG. 7e is a graph showing a typical pressure signal over time of a PSK signal according to the invention.

With the microprocessor programmed as described with reference to FIG. 6b, when PSK-type encoding is utilized, a signal such as seen in FIG. 7e is output by the modulator. In FIG. 7e, three bit periods are shown with data bit values of 0, 1, and 0. The data bit value 0 bits are comprised of four sine waves at 24 Hz, while the data bit value 1 bit is comprised of three and one half sine waves at a nominal 24 Hz rate. When decoding the signal of FIG. 7e, it will be seen that detection of the phase of the signal at times 0, 1, 2, and 3, will provide results of 0, 0, 180, and 180 degrees. The change from 0 to 180 degrees between times 1 and 2 is what provides the bit value 1.

Figure 7F:
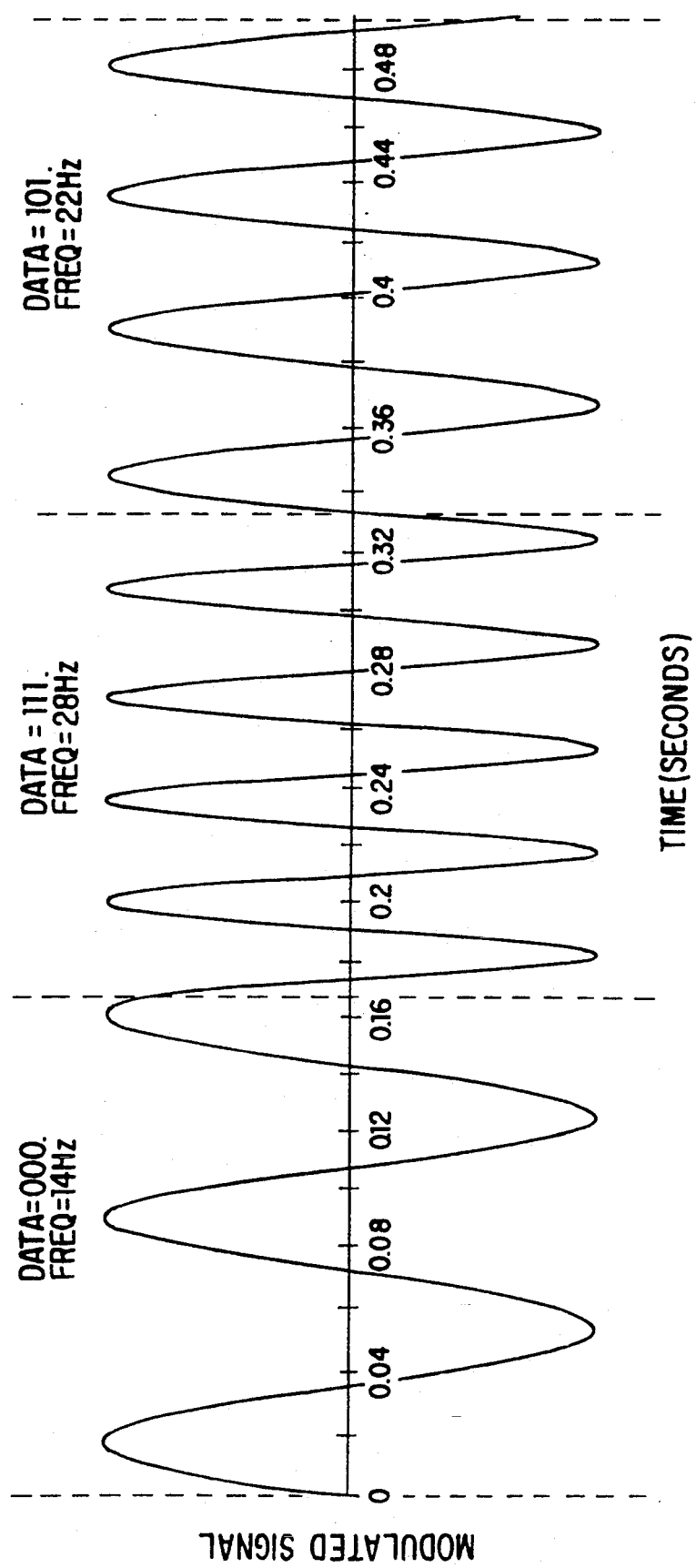
FIG. 7f is a graph showing a typical pressure signal over time of a FSK signal according to the invention.

As aforementioned, PSK-type encoding is not the only type of encoding which can be used with the LWD tool of the invention. Different frequency shift keying techniques may also be advantageously utilized. For example, coherent phase FSK (CPFSK) can be used. In CPFSK, a plurality of frequencies each representing a digital value are sent. The value at given time intervals is obtained by detecting the frequency at the end of the time interval. If eight different frequencies are being utilized, three bits of information can be sent together in a single signal period by choosing a frequency; if sixteen frequencies are used, four bits are sent together. In this manner, the data rate of the system may be increased. An example of a CPFSK signal is seen in FIG. 7f where three bit periods are shown with data bit values, e.g., of 000, 111, and 101. The data word value 000 represents the lowest transmitting frequency of 14 Hz, it being seen that approximately two and one quarter sine waves were received over about 0.167 seconds in the time window before the end of the first period. Data word value 111 represents the highest transmitting frequency of 28 Hz, it being seen that about four and one half (two times two and one quarter) sine waves were received over the same amount of time (0.167 seconds) in the time window of the second period. Finally, data word 101 represents a transmitting frequency of 22 Hz, it being seen that approximately three and two thirds sine waves were received over the same amount of time in the time window of the third period.

The CPFSK encoding technique bas additional advantages over the PSK encoding technique in that there is less wear on the motor and modulator. In CPFSK, the desired carrier frequencies could be, e.g., 14, 16, 18, 20, 22, 24, 26, and 28 Hz. With those frequencies, the magnitude of the accelerations and decelerations required to encode data would be reduced, as the motor velocity change from minimum to maximum would be about 100%, while in the PSK encoding, the minimum to maximum change is almost 200%. If such motor velocity changes are not of concern, if desired, the CPFSK and PSK technique can be combined, such that both the phase and frequency of the signal are determined at predetermined time intervals. In this manner, an extra bit is added to the CPFSK word. Regardless, it will be appreciated that numerous types of encoding can be accomplished with the provided apparatus of the invention.

Figure 8:
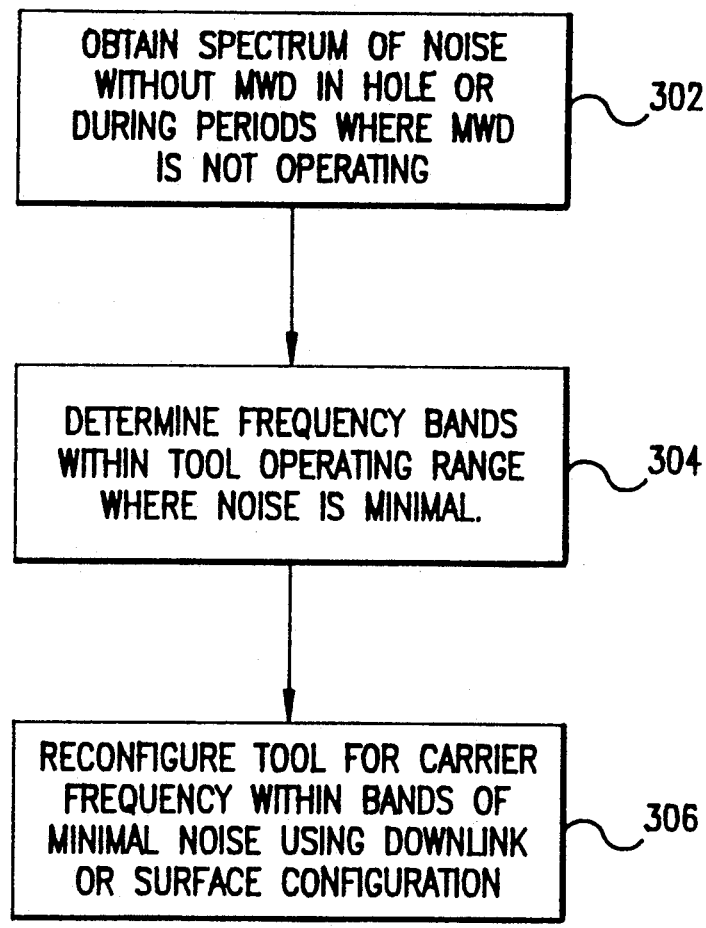
FIG. 8 is a flow chart of the preferred method of the invention for operating the preferred tool of the invention at a desired carrier frequency.

In accord with another aspect of the invention, a flow chart of the preferred method of the invention for operating the LWD at a desired carrier frequency is seen in FIG. 8. In accord with the preferred method, the noise of the entire system is obtained at 302 in the absence of the sending of data, such as during a startup period of the tool. The system noise includes the noise introduced due to the frequency of the mud pumps, as well as the noise introduced by the mud pump motors. The noise of the system is analyzed at 304 by a spectrum analyzer (e.g., a Hewlett Packard 3582A or a processor such as processor 36 typically utilizing a Fourier transform to determine frequency bands within tool operating range where noise is minimal. Then, at 306, one or more frequencies are chosen at and around which there is relatively little noise, and the tool is configured to transmit data at those one or more frequencies. For example, for a PSK type system, where only a single frequency is utilized, the highest operating frequency with a relatively low level of noise is preferably chosen. However, in a FSK system, as discussed above with reference to FIG. 7f, several (e.g., eight) operating frequencies are chosen. In choosing operating frequencies, if possible, a band of, e.g., ±1.5 Hz, (depending upon data rate and/or transmission techniques) around the operating frequency should have relatively low levels of noise.

It should be appreciated that the system noise can be measured either downhole by a sensor (not shown) on the tool or uphole by a pressure sensor 32 (see FIG. 1) or the like. If measured downhole, a downhole processor may be utilized to conduct the noise analysis so as to choose one or more operating frequencies. In such a situation, the tool can inform an uphole processor of the frequency or frequencies of operation via any of several signal schemes. One preferred signalling scheme is to send a regular signal at the frequency or frequencies of choice for a predetermined period of time. The uphole processor then obtains and processes the received signal to determine the frequency or frequencies being sent.

If the system noise is measured uphole prior to the LWD tool being sent downhole, the LWD tool can be configured on the surface to communicate at the desired frequency or frequencies by connecting the tool to a computer which changes configuration file stored in the tool's memory. Once this file is changed, the configuration will remain the same until changed again by another configuration. On the other hand, if the LWD tool is already downhole when the noise analysis is accomplished, or if it is desired to change the configuration of the tool which was previously configured on the surface, operating frequency information can be sent to the LWD tool via any of several known communication schemes such as "Down-Link".

In "Down-link", a number of different operating parameters can be changed, such as baud rate, carrier frequency, data acquisition rate, and data lists or frame. The data acquisition rate is used to slow or stop data recordation when drilling is not occuring, or to increase the speed of data recordation when the pipe is moving quickly (e.g., during tripping out of the hole), while the data lists or frame are used to choose among lists of different measurements to be transmitted uphole, such as sending measurements related to reservoir content while drilling through oil bearing formations. It will be appreciated by those skilled in the art that the change of baud rate and carrier frequency are particularly pertinent to the invention, while the data acquisition rate and data lists are not as applicable.

In order to change an operating parameter, information from uphole must be transferred to the LWD tool. This is accomplished by changing the mud flow rates according to desired signalling schemes. In particular, the LWD tool is powered by a turbine (seen in FIG. 2b) that is exposed to mud flow through the drill pipe. The rotational speed of the turbine is proportional to the mud flow rate assuming that the mud characteristics are held constant. The mud flow rate is varied by changing the stroke rate of the pumps 12 at the surface that generate this flow.

Sensors (not shown) inside the LWD tool measure the rotational velocity of the turbine, providing a means of determining the mud flow rate in the downhole tool. "Down-link" is performed by varying the mud flow rate at the surface in a particular sequence that is recognized by the downhole tool by measuring the rotational velocity of the turbine exposed to the mud.

Before using "Down-link", a calibration is preferably performed that correlates the flow rate at the surface to the RPM of the turbine downhole. The calibration determines three operating points: $FLOW_{off}$, $FLOW_{low}$, and $FLOW_{high}$. $FLOW_{off}$ is determined by increasing the flow rate to a point where the tool is on, then slowly decreasing the flow rate until the turbine speed is insufficient to power the modulator but is still sufficient to power the microprocessor electronics. $FLOW_{low}$ is determined by increasing the flow rate until the tool turns on, and then varying the flow rate until the turbine reaches a predetermined rate (e.g., 1500 RPM). $FLOW_{high}$ is determined by increasing the flow rate above $FLOW_{low}$ until the turbine rotates at a second predetermined rate which is preferably 1000 RPM greater than $FLOW_{low}$.

The preferred procedure to enter "Down-link" is to start the mud pumps and increase the flow rate to $FLOW_{low}$. The flow rate is held at the $FLOW_{low}$ level until the tool has sent a first predetermined number of binary 0's (e.g., sixty), and less than a second predetermined number of binary 1's. Before reaching the second predetermined number of binary 1's, the flow rate is lowered to $FLOW_{off}$ and held there for a desired amount of time, e.g., sixty seconds. The flow rate is then raised to $FLOW_{high}$ and held there for another amount of time, e.g., five seconds. The flow rate is then lowered to $FLOW_{low}$ and held there until the tool transmits a predetermined sequence of ones and zeroes which confirms that the tool is now in "Down-link" mode. Then, the "Down-link" mode commands are transmitted by alternating from $FLOW_{low}$ to $FLOW_{high}$, with information being transferred based on the number of flow rate transitions.

Turning to FIGS. 9a and 9b, the anti-jamming aspect of the invention is seen. Debris in the mud flowing through the modulator has the potential to jam between the modulator rotor and the stator or housing, causing the rotor to stop moving. This can produce two major problems. First, if the jam is not removed promptly, the signal the modulator produces will disappear completely and the surface equipment will lose signal synchronization. Second, if the jam occurs near the full-closed position of the modulator, the reduction in mud flow may result in a loss of power to the tool. If the magnetic positioner is not powerful enough to remove the jam after the power is lost, the modulator will remain in the full closed position, and tripping out of the well is required.

In the prior art, a jam condition was detected by detecting current limits on the motor drive circuitry, at which point the drive circuitry attempted to drive the motor in the opposite direction for a given time. In the preferred embodiment of the invention, both the manner of detecting a jam, and the manner of clearing the jam are different than in the prior art. In particular, the position sensor 110 of the invention (see FIGS. 2c and 6a) which tracks the actual position of the modulator is used as a feedback mechanism to the microprocessor in order to determine whether a jam has occurred. In clearing the jam, it is the aim of the microprocessor to bring the modulator to a fully open position. In addition, the microprocessor tracks the frequency of jam conditions, and if several jams have occurred in a short period of time, the modulator is held in the fully open position for a desired amount of time which will allow high concentrations of debris to flow past the modulator.

The basic functionality of the anti-jamming aspect of the invention is seen in the high level flow chart of FIG. 9a. At step 402, a determination is made by the microprocessor as to whether the position error has reached the error threshold. If not, normal operation is resumed at 499. If the position error has reached the error threshold, then at 404, a determination is made as to whether the velocity of the modulator is below the velocity threshold. If not, normal operation is resumed at 499. If yes, however, a determination is made at 405a that the modulator is jammed. When the modulator is jammed, the microprocessor attempts to reverse the direction of the modulator and back it up to a fully open position. If at 405b the full open position is reached, a determination is made at 405c whether a certain number of jams (e.g., five) have occurred within a predetermined length of time (e.g., three seconds), or within a predetermined length of time relative to each other (e.g., each jam occurs within three seconds of a previous jam). If yes, at 405d, the modulator is held in the full open position for another predetermined length of time (e.g., ten seconds). If not, normal operation is resumed at 499.

If the fully open position is not reached at step 405b, it is either because the original jam has locked the rotor into a fixed position, or a new jam has occured while backing up. Thus, as shown in FIG. 9a, if the fully open position is not reached, normal operation is resumed at 499. Normal operation will cause the microprocessor to step through step 402 and possibly 404 again, with the microprocessor now attempting to bring the modulator into forward motion (i.e., reversing the back-up). If the modulator can go forward, it continues going forward, and the jam program is released (continue at step 499). On the other hand, if the modulator is still jammed, the position error will become large at step 402, and the modulator will not meet the velocity criteria of step 404. Thus, the software will cause the modulator to reverse direction again at 405a in response to the detection of the jam. It should be appreciated that if continuous jamming occurs, a trip out of the borehole may be necessary.

Turning now to FIG. 9b, a more detailed software flow diagram is provided of the preferred anti-jamming software for the microprocessor of FIG. 2. As seen at steps 402, 404, and 406 of FIG. 9b, a jam is declared (at 406) if the position error has reached a maximum threshold (at 402), and the average velocity of the rotor is below a minimum threshold (at 404). Preferably, the maximum value of position error is defined according to:

$$\text{max\_posn\_error} = \text{desired\_posn\_error} + 10(\text{phasetbl}[0]) \quad (9)$$

where desired_posn_error is the desired position error (i.e., the non-zero, but finite position error discussed above with reference to the adaptive PD control system) which can be determined through testing, and phasetbl[0] is the first element of the phase table which is the full speed value of posn_inc for the particular carrier frequency, described above with reference to FIG. 6b. The desired position error is typically determined by running the brushless DC motor out of the borehole and measuring the steady-state position error for a plurality of modulator frequencies; the desired position error being a linear function of frequency.

With reference to equation (9), it should be appreciated that the the maximum position error is set at the desire position error plus ten times the phase table value, because if the modulator is totally jammed (i.e., not moving), a maximum position error will be reached in ten milliseconds. This permits an extremely quick determination of jamming. On the other hand, as noted above, even if the posn_error reaches the maximum threshold, a jam is not declared unless the velocity is below the velocity threshold, as a lack of power for turning the motor at the commanded speed should not be interpreted as a jam. Rather, it should be interpreted as the inability of the tool to generate the desired carrier frequency, and the carrier frequency should be reduced.

If the posn_error has reached the maximum value allowed, and the velocity is below the desired threshold, the jam trigger (jam_trig) is set at 406, and at step 408, the microprocessor determines what state (ajam_state) the jam program is in. State 0 is the default state for the anti-jam code and functions to stop the motor and prepares it to back up once the jam trigger has been set. State 1 is the state in which action is taken to clear the jam. State 2 is a waiting state.

As seen in FIG. 9b, the first function of state 0 of the anti-jam software is to determine at 412 whether the jam trigger has been set. This is because the anti-jam software is always run, even in the absence of a jam. In particular, if one of the posn_error or the velocity have not met their respective thresholds, then at 410, the jam_trig flag is cleared, and the program continues at step 408 to determine the ajam_state. Since the ajam_state is set to zero when no jam is being processed, the program would continue at 412. If the jam_trig flag is not set, the program exits the anti-jam code at 499. On the other hand, if the jam_trig flag was set (at step 406), then the program continues at step 414 by setting posn_error and the posn_inc equal to zero thereby stopping the motor as the PD controller is told that there is no error in position and no motion is desired. In addition, at step 414, the variable jam_posn is set to the signal_posn, which is the current position of the modulator, and the microprocessor clears the finished backing and reverse_jam flags which are discussed hereinafter. The jam_posn variable is used to determine where the previous fully-open position of the modulator was so that the motor can back up to that position. If the jam occurred within two hundred counts of the previous fully-open position as determined at 415, then 8192 counts are added at 416 to the jam_posn, thereby causing the code to back the motor past the first fully-open position and to stop at the second previous fully-open position. Further, at step 414, the code stores the proportional gain variable (controller "constant") P into prev_P, which is used to restore P after it is manipulated in State 1 as hereinafter described.

After the 8192 counts are added at 416 if required, a determination is made at 418 as to whether the jam occurred within three seconds of a previous jam. In order to make that determination, a clock is set, and then reset each time a jam determination is made. If the jam did not occur within three seconds of a previous jam, the jam_count which keeps track of the frequency of the jams is set to a value of one at step 422, and then the ajam_state is set to State 1 at step 426. If the jam did occur within three seconds of a previous jam, the jam count is incremented at 424, and the ajam_state is then set to State 1 at step 426. The anti-jam code then exits at step 499.

With the ajam_state set at State 1, the next time the software enters the anti-jam code, at step 408, State 1 will be chosen as the ajam_state. State 1 takes the action to clear the jammed debris. It does so by commanding the motor to back up to the fully open position determined by State 0 (at steps 412, 414 and 416) and waiting until the motor reaches that position. The code of State 1 also checks to see if a jam occurs while the motor is backing up. In particular, if the motor has not finished backing up as determined at step 432, the jam_trig and reverse_jam flags have not been set as determined at step 434, the jam_posn is not zero or less than fifty as determined at steps 436 and 438, then, at step 442, the posn_inc is set to minus fifty (−50), and the jam_posn is set to equal the jam_posn −50 at step 444. Setting the jam_posn in this manner causes the jam_posn to be decremented to zero in fifty count steps, while setting the posn_inc in this manner reflects this desired position to the PD controller. Thus, the program will cycle from steps 442 and 444 to step 499, back through steps 402, 410, 408, 432, 434, 436, 438, until the jam_posn is determined at step 438 to be less than fifty. When the jam_posn is less than fifty, then, at steps 446 and 448 the posn_inc is set to be equal to the the opposite of the jam_posn, and the jam_posn is set to zero. In this manner, the motor is instructed to attain a position of zero.

Once jam_posn is set to zero at step 448, when the software circulates back to step 436, the program continues at step 452 where the posn_inc is set to zero. If the actual motor position (signal_posn) is within twenty counts of zero, as determined at 454, then the finished_backing flag is set at step 456, and P is set to prev_P. Upon another run-through of the anti-jamming code, at step 432, a determination would be made that finished_backing is set. Then at step 462, if the jam_count is determined to be less than or equal to five, at step 463 the jammed flag is cleared, the posn_error is set to zero, and the ajam_state is set to zero, and the motor software resumes the normal functioning so that the motor may be moved forward. On the other hand, if the jam_count is determined to be more than five, the ajam_state is set to State 2 at step 464.

The function of State 2 is to cause the system to wait ten seconds with the modulator in the fully open position so that debris which has caused multiple jams can pass through the modulator. Thus, when the ajam_state set to State 2, upon reaching step 408, the program continues at step 466 where a determination is made as to whether ten seconds have elapsed. If not, the program cycles through until ten seconds have elapsed. Then, at step 468, the jam_count is set back to one, and the ajam_state is reset to State 1. With the ajam_state reset to State 1, upon the program reaching step 408, State 1 will be chosen, and the program will continue with steps 432, 462, and 463 where the jammed flag is cleared, the posn_error is set to zero, the ajam_state is set to zero, and the motor software resumes its normal functioning.

Returning to State 1, and as mentioned above with reference to FIG. 9a, it will be appreciated that the modulator can also get jammed while going in the reverse direction. While the jam_trig software can detect all forward jams, it will not detect reverse_jams that occur close to the fully-open position, because the posn_error may be too small when the reverse-jam occurs close to the fully-open position. Therefore, the code performs another test based on posn_error and controller duty cycle to detect reverse-jams. Thus, while in State 1, and after cycling through steps 436, 452, and 454, if at step 454 it is determined that the actual signal_posn is not within twenty counts of zero, then at step 472, the P variable is incrementally increased in order to increase the duty cycle until it reaches its maximum of 1000. If, upon increasing of duty cycle, the posn_error changes as determined at step 474, then, the program continues to cycle in State 1 until the signal_posn is within twenty counts of zero. If, however, upon increasing the duty cycle the posn error does not change, the reverse_jam flag is set at 476 to indicate that there is reverse jamming. Then, upon cycling through the antijamming code, at step 434, the reverse_jam flag will cause the program to continue at step 463 where the jammed flag is cleared, and the posn_error and ajam_state are reset. This tells the software that the motor should go forward.

In sum, any of three flags tell the microprocessor that the motor should resume its forward motion. The finished_backing flag indicates the backing up procedure was accomplished successfully such that resumed normal functioning of the modulator is desired. On the other hand, if the jam_trig flag or the reverse_jam flags are set when the motor is in the process of backing up the modulator (State 1), a reverse-jam is indicated, and the motor is told to resume forward motion to avoid the reverse jam.

There have been described and illustrated herein LWD tools which are capable of transmitting signals at different frequencies. While particular embodiments of the invention have been described, it is not intended that the invention be limited thereto, as it is intended that the invention be as broad in scope as the art will allow and that the specification be read likewise. Thus, while a particular motor and a particular position sensor were described as preferred, it will be appreciated that other motors and position sensors can be utilized. Likewise, while particular modulator arrangements were described, it will be appreciated that other modulators with different rotors and stators, etc. could be utilized. Further, while the position sensor was described as being coupled to the motor shaft, it will be appreciated that the position sensor could be coupled to the rotor shaft of the modulator or to one of the shafts of the step-down gear assembly, as all of them are rigidly coupled to each other, and all have relative rotational positions. Thus, the invention simply requires that some mechanism be provided for sensing the position of the motor or modulator rotor and for using the sensed position as feedback to the mechanism for driving the motor. Also, while flow-charts representing partial programming of the downhole microprocessor and the up-hole processor were set forth in conjunction with the invention, it will be appreciated that other programs which would be represented by different flow-charts could be utilized. Further, while particular PSK-type and FSK-type encoding schemes were described, it will be appreciated that with the capabilities of the tool of the invention, other encoding schemes such as, without limitation, on-off keying (positive pulse) can be utilized. It will therefore be appreciated by those skilled in the art, that yet other modifications could be made to the provided invention without deviating from its spirit and scope as so claimed.

What is claimed is:

1. A method for determining whether an encoder of a borehole, tool is jammed, said borehole tool having a motor with a drive shaft which is coupled to and drives said encoder, a position sensor coupled to the motor for sensing the position of the motor and a microprocessor means coupled to the position sensor and to the motor in a feedback loop, with the microprocessor means for controlling the movement of the motor based on the position of the motor and a desired position of the motor, said method comprising:
   a) at a first plurality of times, determining positions of said motor from said position sensor;
   b) determining position errors of said motor from said positions of said motor and desired positions of said motor as determined by said microprocessor;
   c) determining with said microprocessor whether said encoder is jammed based on whether said position errors exceed a first threshold value.

2. A method according to claim 1, wherein:
said first threshold value is defined according to $$\text{max\_posn\_error} = \text{desired\_posn\_error} + x$$

where max_posn_error is said first threshold value, desire_posn_error is a fixed non-zero position error relating to said borehole tool and a carrier frequency at which said borehole tool encodes data, and x is a value based on a full speed value of said motor for said carrier frequency.

3. A method according to claim 2, wherein:
x is equal to an integer value times said full speed value of said motor for said carrier frequency.

4. A method according to claim 1, further comprising:
   d) determining with said microprocessor and from said positions, the rotational velocity of said motor, wherein,
   said step of determining whether said encoder is jammed is further based on whether said motor velocity exceeds a second threshold value at a time when said position error exceeds said first threshold value.

5. A method according to claim 4, wherein said encoder has a plurality of positions including a fully open position, said method further comprising:
   e) upon determining that said encoder is jammed, reversing the direction of rotation of said motor and attempting to drive said encoder to said fully open position.

6. A method according to claim 5, further comprising:
   f) while reversing said direction of rotation, sensing the position of said motor, and if said encoder is not driven to said fully open position, reversing said direction of rotation again.

7. A method according to claim 6, further comprising:
repeating steps a) through e).

8. A method according to claim 4, further comprising:
   d) counting the number of times a determination is made that the encoder is jammed within a predetermined length of time, and
   e) if the encoder has jammed a predetermined number of times within said predetermined length of time, driving said encoder to said fully open position, and holding said encoder in said fully open position for a second predetermined length of time.

9. A method according to claim 8, wherein:
said second predetermined length of time comprises a plurality of seconds.

10. A method according to claim 1, wherein said encoder has a plurality of positions including a fully open position, said method further comprising:
   d) upon determining that said encoder is jammed, reversing the direction of rotation of said motor and attempting to drive said encoder to said fully open position.

11. A method according to claim 10, further comprising:
   e) while reversing said direction of rotation, sensing the position of said motor, and if said encoder is not driven to said fully open position, reversing said direction of rotation again.

12. A method according to claim 1, wherein said encoder has a plurality of positions including a fully open position, said method further comprising:
   d) counting the number of times a determination is made that the encoder is jammed within a predetermined length of time, and
   e) if the encoder has jammed a predetermined number of times within said predetermined length of time, driving said encoder to said fully open position, and holding said encoder in said fully open position for a second predetermined length of time.

13. An apparatus for use in a borehole having borehole fluid flowing therethrough, said tool comprising:
   a) a brushless DC motor having a rotating drive shaft;
   b) an encoder means including a stator, and a rotor coupled to said rotating drive shaft, said rotor rotating relative to said stator thereby creating a signal in the borehole fluid;
   c) a position sensor coupled to said rotating drive shaft of said brushless DC motor, said position sensor providing indications related to the rotational position of said brushless DC motor;
   d) motor drive circuitry coupled to and driving said brushless DC motor; and
   e) a microprocessor means coupled to said position sensor and coupled to said motor drive circuitry, said microprocessor means for causing said motor drive circuitry to provide drive signals to said brushless DC motor based on actual rotational positions of said brushless DC motor as provided by said indications of said position sensor, and upon desired rotational positions as determined by said microprocessor, wherein,
   said microprocessor includes anti-jamming means, said anti-jamming means including means for determining position errors of said brushless DC motor based on said indications provided by said position sensor, and means for determining whether said encoder means is jammed based on whether at a particular time a determined position error exceeds a first threshold value.

14. An apparatus according to claim 13, wherein:
said anti-jamming means includes means for determining from said indications of said position sensor the velocity of said brushless DC motor, and
said means for determining whether said encoder means is jammed determines whether said encoder means is jammed further based on whether said motor velocity exceeds a second threshold value.

15. An apparatus according to claim 13, wherein:
said first threshold value is defined according to $$\text{max\_posn\_error} = \text{desired\_posn\_error} + x$$

where max_posn error is said first threshold value, desired_posn_error is a fixed non-zero position error relating to said borehole tool and a carrier frequency at which said borehole tool encodes data, and x is a value based on a full speed value of said brushless DC motor for said carrier frequency.

16. An apparatus according to claim 15, wherein:
x is equal to an integer value times said full speed value of said brushless DC motor for said carrier frequency.

17. An apparatus according to claim 13, wherein:
said anti-jamming means further comprises means for reversing direction of rotation of said rotating drive shaft, said means for reversing direction including said microprocessor means and said motor drive circuitry.

18. An apparatus according to claim 17, wherein:
said anti-jamming means further comprises means for determining whether said encoder means jams when said direction of rotation of said rotating drive shaft is reversed.

19. An apparatus according to claim 13, wherein:
said microprocessor further comprises counting means for counting the number of times a determination is made that said encoder means is jammed within a predetermined length of time.

* * * * *